US012614979B2

(12) United States Patent
Yang et al.

(10) Patent No.: US 12,614,979 B2
(45) Date of Patent: Apr. 28, 2026

(54) POWER CONVERTER INTEGRATED CIRCUIT

(71) Applicant: Cirrus Logic International Semiconductor Ltd., Edinburgh (GB)

(72) Inventors: Seunguk Yang, Gyeonggi-do (KR); SeHyung Jeon, Seoul (KR); Sangjun Lee, Seoul (KR); Cheolhwan An, Seoul (KR)

(73) Assignee: Cirrus Logic Inc., Austin, TX (US)

( * ) Notice: Subject to any disclaimer, the term of this patent is extended or adjusted under 35 U.S.C. 154(b) by 632 days.

(21) Appl. No.: 18/165,571

(22) Filed: Feb. 7, 2023

(65) Prior Publication Data

US 2024/0266953 A1    Aug. 8, 2024

(51) Int. Cl.
| | |
|---|---|
| *H02M 3/07* | (2006.01) |
| *H02J 7/90* | (2026.01) |
| *H02M 1/00* | (2006.01) |
| *H02M 3/158* | (2006.01) |

(52) U.S. Cl.
CPC ................. *H02M 3/07* (2013.01); *H02J 7/90* (2026.01); *H02M 1/0095* (2021.05); *H02M 3/158* (2013.01); *H02J 2207/20* (2020.01)

(58) Field of Classification Search
CPC ....... H02M 3/07; H02M 3/158; H02M 1/0095
See application file for complete search history.

(56) References Cited

U.S. PATENT DOCUMENTS

| | | | |
|---|---|---|---|
| 9,143,032 B2 | 9/2015 | Le et al. | |
| 9,601,998 B2 | 3/2017 | Le et al. | |

| | | | |
|---|---|---|---|
| 9,899,919 B2 | 2/2018 | Crossley et al. | |
| 10,063,139 B2 | 8/2018 | Le et al. | |
| 10,141,844 B2 | 11/2018 | Le et al. | |
| 10,236,766 B2 | 3/2019 | Meyvaert et al. | |
| 10,243,457 B2 | 3/2019 | Puggelli et al. | |
| 10,274,987 B2 | 4/2019 | Puggelli et al. | |
| 10,289,146 B2 | 5/2019 | Puggelli et al. | |
| 10,320,295 B2 | 6/2019 | Crossley et al. | |
| 10,355,593 B1 | 7/2019 | Puggelli et al. | |

(Continued)

FOREIGN PATENT DOCUMENTS

| | | | | | |
|---|---|---|---|---|---|
| CN | 108631340 A | * | 10/2018 | .......... | H02M 1/0095 |
| EP | 4030609 A1 | * | 7/2022 | ............ | H02M 1/088 |

OTHER PUBLICATIONS

Combined Search and Examination Report under Sections 17 and 18(3), UKIPO, Application No. GB2318285.0, mailed May 16, 2024.

*Primary Examiner* — Crystal L Hammond
*Assistant Examiner* — Jennifer C Caulk
(74) *Attorney, Agent, or Firm* — Jackson Walker L.L.P.

(57) ABSTRACT

A power converter integrated circuit includes a switch network, coupling nodes for first and second flying capacitors, an output capacitor, and an inductor. The circuit operates in two forward modes: a switched capacitor converter mode and an inductive converter mode. In the switched capacitor mode, the switch network couples the first flying capacitor in series with the output capacitor in a first phase, and in parallel in a second phase. In the inductive converter mode, the switch network couples the first flying capacitor in series with the inductor and output capacitor in one phase, and then couples the first flying capacitor in parallel with the output capacitor via the inductor in a subsequent phase. This dual-mode operation allows for versatile power conversion.

19 Claims, 33 Drawing Sheets

(56) References Cited

U.S. PATENT DOCUMENTS

| 10,389,244 | B2 | 8/2019 | Le et al. |
| 10,411,490 | B2 | 9/2019 | Melgar et al. |
| 10,523,039 | B2 | 12/2019 | Melgar et al. |
| 10,541,603 | B2 | 1/2020 | Puggelli et al. |
| 10,601,311 | B2 | 3/2020 | Meyvaert et al. |
| 10,673,335 | B2 | 6/2020 | Le et al. |
| 10,715,035 | B2 | 7/2020 | Li et al. |
| 10,719,099 | B2 | 7/2020 | Puggelli et al. |
| 10,720,832 | B2 | 7/2020 | Meyvaert et al. |
| 10,770,972 | B2 | 9/2020 | Crossley et al. |
| 10,833,579 | B1 | 11/2020 | Puggelli et al. |
| 11,342,844 | B1 | 5/2022 | Meyvaert |
| 11,515,784 | B2 | 11/2022 | Meyvaert et al. |
| 11,522,466 | B1 | 12/2022 | Li et al. |
| 11,581,806 | B2 | 2/2023 | Meyvaert |
| 11,855,531 | B2 | 12/2023 | Lim |
| 11,949,332 | B2 | 4/2024 | Lim |
| 12,107,494 | B2 | 10/2024 | Lesso |
| 12,155,299 | B2 | 11/2024 | Lim |
| 12,166,422 | B2 | 12/2024 | Meyvaert |
| 12,191,766 | B2 | 1/2025 | Lim |
| 12,267,016 | B2 | 4/2025 | Lesso |
| 12,283,838 | B2 | 4/2025 | Morgan |
| 12,456,921 | B2 | 10/2025 | Lesso |
| 12,549,098 | B2 | 2/2026 | Yang et al. |
| 2022/0052546 | A1 | 2/2022 | Morgan et al. |
| 2023/0013025 | A1* | 1/2023 | Kumar ................ H02M 1/0095 |
| 2024/0204661 | A1 | 6/2024 | Chen et al. |
| 2024/0333011 | A1 | 10/2024 | Perry et al. |
| 2025/0055374 | A1 | 2/2025 | Meyvaert |
| 2025/0192680 | A1 | 6/2025 | Lesso |

* cited by examiner

100
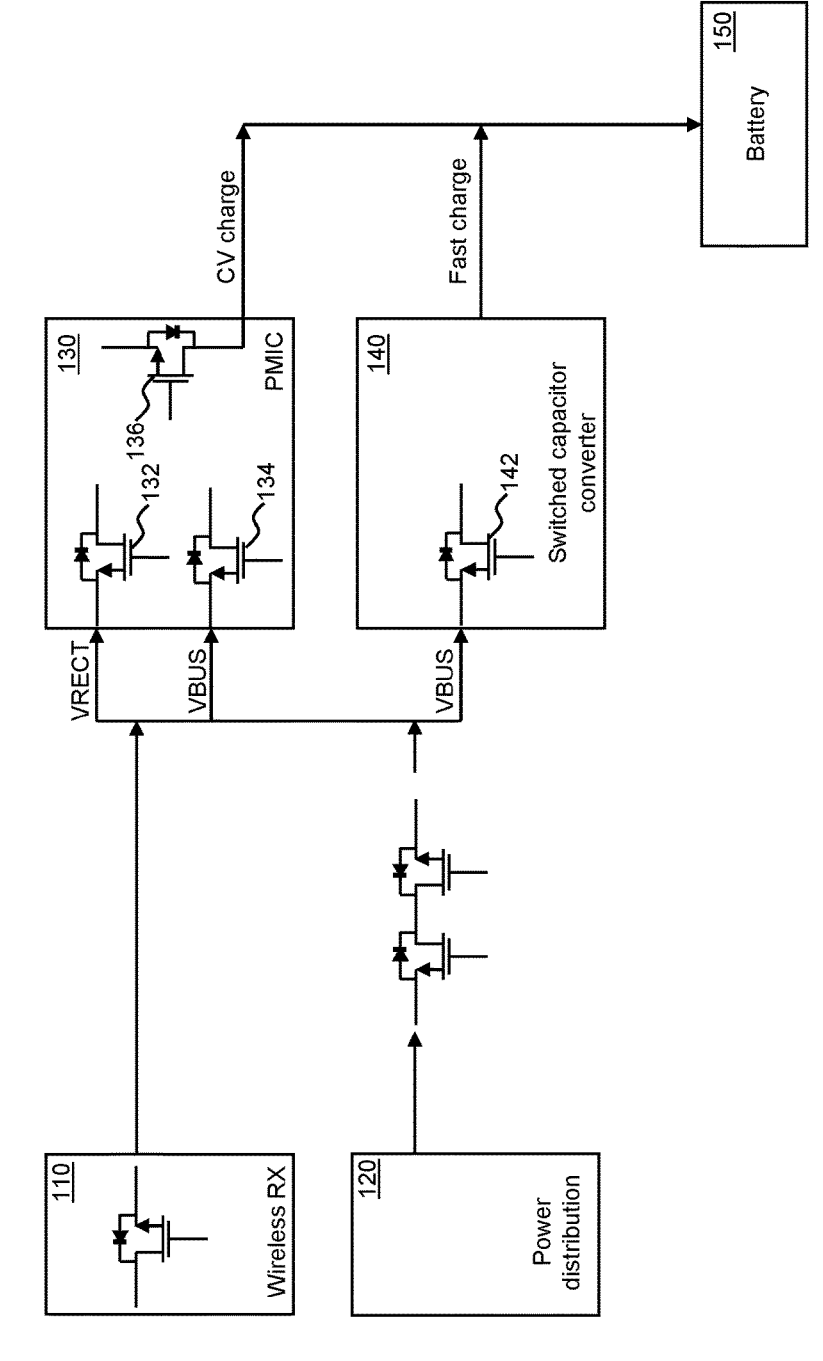

Controller
495

Controller
495

490

VIN

440

470

482

VOUT

480

400

Controller
495

POWER CONVERTER INTEGRATED CIRCUIT

FIELD OF THE INVENTION

The present disclosure relates to a power converter integrated circuit, and in particular to a power converter integrated circuit for use in a battery charging system of a portable electronic device.

BACKGROUND

Portable electronic devices such as smartphones, tablet and laptop computers are typically powered by a rechargeable battery or battery pack. Such devices typically also include charging circuitry for charging the battery or battery pack from an external power supply such as a USB (Universal Serial Bus) charging device or a mains adapter that converts a mains AC voltage from a domestic electrical outlet to a DC voltage that can be used by the charging circuitry.

An increasing number of such portable electronic devices support wireless charging, i.e. the ability to charge the device battery or battery pack from an external supply without requiring a physical (e.g. plug and socket) connection between the device and an external power supply. In such devices power can be transferred to the device from a wireless charger (e.g. a mat or pad) by means of inductive coupling between a transmitting coil of the wireless charger and a coil of the charging circuitry of the device.

Some such devices also support "reverse wireless charging", which is the ability of the device to transfer electrical power to another device without requiring a physical connection between the power-supplying device and the power-receiving device. In such devices this transfer of power is typically achieved by means of inductive coupling between a coil of the power-supplying device and a coil of the charging circuitry of the power-receiving device. As will be appreciated, in devices that support reverse wireless charging, the coil of the charging circuitry is used as a receiving coil to receive power from a charger when the device is being charged, and is used as transmitting coil to transmit power when the device is transferring power to another device.

SUMMARY

According to a first aspect, the invention provides a power converter integrated circuit comprising:

a switch network comprising:
    a plurality of switches;
    a first set of coupling nodes for coupling the switch network to a first flying capacitor;
    a second set of coupling nodes for coupling the switch network to a second flying capacitor;
    an output node for coupling the switch network to an output capacitor;
and
    a third set of one or more coupling nodes for coupling the switch network to an inductor,
wherein the power converter integrated circuit is operable in a first forward mode as a switched capacitor converter and in a second forward mode as an inductive converter,
wherein:
    in the first forward mode the switch network is operable to couple the first flying capacitor in series with the output capacitor in a first phase of operation, and to couple the first flying capacitor and the output capacitor in parallel in a second phase of operation; and
    in the second forward mode the switch network is operable to couple the first flying capacitor in series with the inductor and the output capacitor in a phase of operation and to couple the first flying capacitor in parallel with the output capacitor, via the inductor, in a subsequent phase of operation.

In operation of the power converter integrated circuit in the first forward mode, the switch network may be operable to couple the first and second flying capacitors in series with the output capacitor in a first phase of operation, and to couple the first and second flying capacitors and the output capacitor in parallel in a second phase of operation.

In operation of the power converter integrated circuit in the second forward mode, the switch network may be operable to couple the first flying capacitor in series with the inductor and the output capacitor in a phase of operation and to couple the first flying capacitor in parallel with the output capacitor, via the inductor, in a subsequent phase of operation.

The switch network may be operable to couple the inductor in parallel with the output capacitor in a further phase of operation.

The switch network may be operable to couple the inductor in series with the output capacitor in a further phase of operation.

In operation of the power converter integrated circuit in the second forward mode, the switch network may be operable to couple the inductor in series with the output capacitor in a first phase of operation, and to couple the inductor in parallel with the output capacitor in a second phase of operation.

The power converter integrated circuit may be operable in a first reverse mode as a switched capacitor converter and in a second reverse mode as an inductive boost converter.

In operation of the power converter integrated circuit in the first reverse mode, the switch network may be operable to couple the first flying capacitor to the output node of the power converter integrated circuit in a first phase of operation, and to couple the first flying capacitor in series between the output node and an input node of the power converter integrated circuit in a second phase of operation.

In operation of the power converter integrated circuit in the first reverse mode, the switch network may be operable to couple the first and second flying capacitors in parallel with each other to the output node of the power converter integrated circuit in a first phase of operation, and to couple the first and second flying capacitors in series between the output node and an input node of the power converter integrated circuit in a second phase of operation.

In operation of the power converter integrated circuit in the second reverse mode, the switch network may be operable to couple the first and second flying capacitors in parallel with each other and in series with the inductor in a phase of operation and to couple the inductor and the first flying capacitor in series between the output node and the input node in a subsequent phase of operation.

In operation of the power converter integrated circuit in the second reverse mode, the switch network may be operable to:
    couple the inductor to the output node of the integrated power converter integrated circuit in a first phase of operation;

couple the first and second flying capacitors in parallel with each other and in series with the inductor in a second phase of operation;

couple the inductor to the output node in a third phase of operation; and couple the inductor and the first flying capacitor in series between the output node and the input node in a fourth phase of operation.

In operation of the power converter integrated circuit in the second reverse mode, the switch network may be operable to:

couple the inductor in series between an input node and the output node of the power converter integrated circuit in a first phase of operation;

couple the first and second flying capacitors in parallel with each other and in series with the inductor in a second phase of operation;

couple the inductor in series between the input node and the output node in a third phase of operation; and couple the inductor and the first flying capacitor in series between the output node and the input node in a fourth phase of operation.

In operation of the power converter integrated circuit in the second reverse mode, the switch network may be operable to couple the inductor to an output node of the power converter integrated circuit in a first phase of operation, and to couple the inductor in series between the output node and an input node of the power converter integrated circuit in a second phase of operation.

The third set of one or more coupling nodes may comprise a first inductor coupling node and the output node.

The switch network may comprise first to tenth switches, and, in use of the power converter integrated circuit:

the output capacitor may be coupled to the output terminal;

a first terminal of the first flying capacitor may be coupled to a first switch network node between the first switch and the fourth switch;

a second terminal of the first flying capacitor may be coupled to a second switch network node between the second switch and the fifth switch;

a first terminal of the second flying capacitor may be coupled to a third switch network node between the second switch and the sixth switch;

a second terminal of the second flying capacitor may be coupled to a fourth switch network node between the third switch and the seventh switch;

a first terminal of the inductor may be coupled to a switch network node between the ninth switch and the tenth switch;

the eighth switch may be coupled between the third switch network node and the first terminal of the inductor;

the ninth switch may be coupled between the first switch network node and the first terminal of the inductor; and the tenth switch may be coupled between the first terminal of the inductor and the reference voltage terminal.

The fourth switch and/or the sixth switch may comprise a first MOSFET device and a second MOSFET device, wherein a source terminal of the first MOSFET device is coupled to a source terminal of the second MOSFET device such that an anode of a body diode of the first MOSFET device is coupled to an anode of a body diode of the second MOSFET device.

The power converter integrated circuit may further comprise an input switch coupled between an input node of the power converter integrated circuit and the first switch.

According to a second aspect, the invention provides power converter circuitry for generating an output voltage based on an input voltage, the power converter circuitry comprising:

a switch network comprising:

a plurality of switches;

a first set of coupling nodes for coupling the switch network to a first flying capacitor;

a second set of coupling nodes for coupling the switch network to a second flying capacitor;

an output node for coupling the switch network to an output capacitor; and a third set of one or more coupling nodes for coupling the switch network an inductor, wherein the power converter circuitry is operable in:

a first forward mode in which a substantially integer conversion factor is applied to the input voltage to generate the output voltage; and a second forward mode in which a non-integer conversion factor is applied to the input voltage to generate the output voltage.

According to a third aspect, the invention provides power converter circuitry comprising switched capacitor power converter circuitry and inductive buck or inductive boost converter circuitry, the power converter circuitry comprising:

a switch network configured to be coupled, in use of the power converter circuitry to:

at least one flying capacitor;

an output capacitor; and an inductor, wherein, in use of the power converter circuitry, the switch network, the at least one flying capacitor and the output capacitor are common to both the power converter circuitry and the inductive buck or inductive boost converter circuitry.

According to a fourth aspect, the invention provides a battery charging system comprising the power converter integrated circuit of the first aspect or the power converter circuitry of the second or third aspects.

According to a fourth aspect, the invention provides a host device comprising the power converter integrated circuit of the first aspect or the power converter circuitry of the second or third aspects, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console a VR or AR device, a mobile telephone, a portable audio player or other portable device.

BRIEF DESCRIPTION OF THE DRAWINGS

Embodiments of the invention will now be described, strictly by way of example only, with reference to the accompanying drawings, of which:

FIG. 1a is a schematic representation of a charging system of a portable electronic device;

FIG. 1b is a schematic representation of switched capacitor converter circuitry suitable for use in the charging system of FIG. 1a;

FIG. 1c is a schematic representation of inductive buck converter circuitry suitable for use in the charging system of FIG. 1a;

DETAILED DESCRIPTION

Figure 1B:
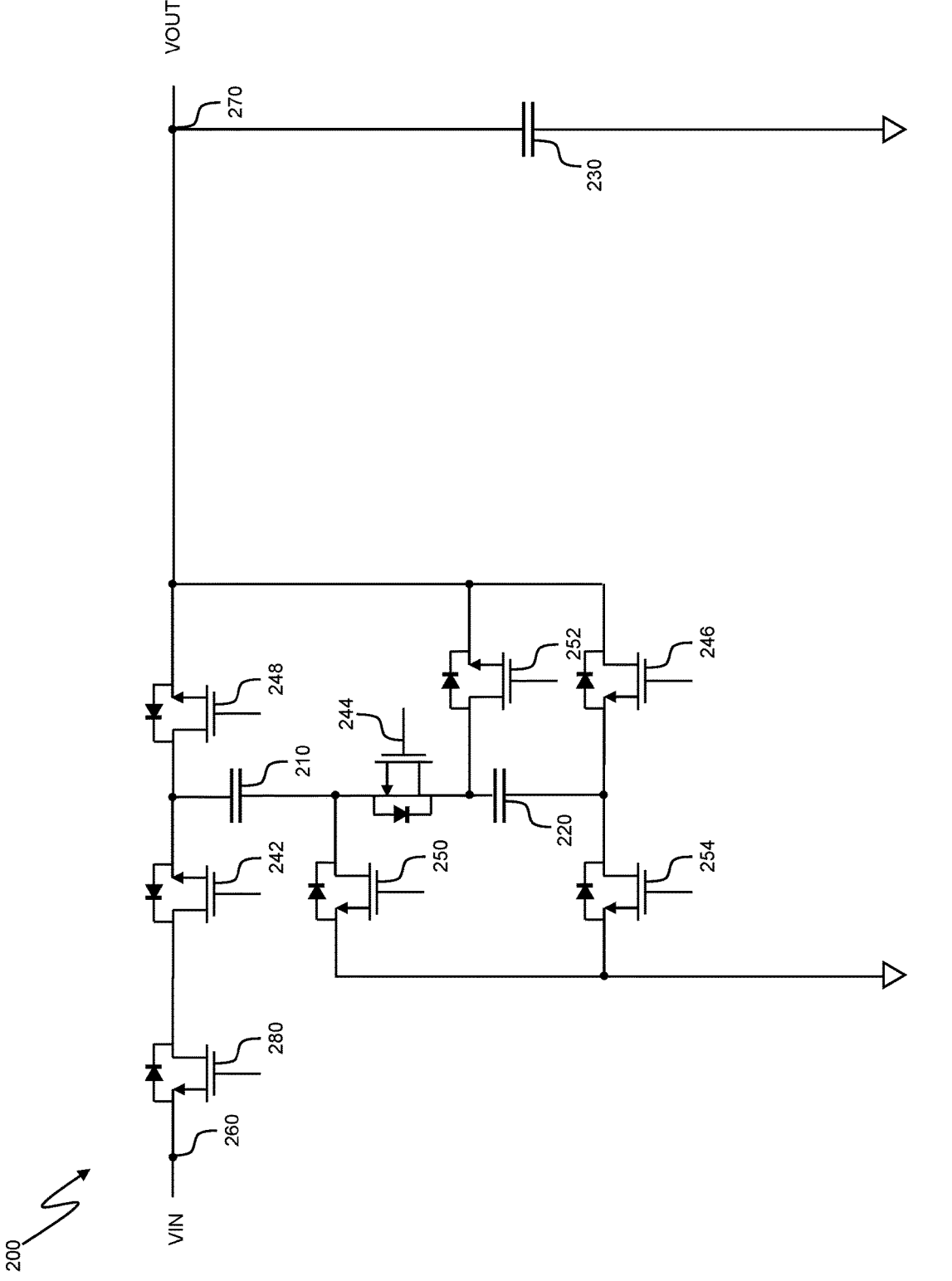

A common strategy for charging a battery or battery pack (hereinafter referred to as a battery, for conciseness) in a portable electronic device uses two distinct stages. In a first stage a fast charging approach is used, in which a constant voltage is supplied to the battery to charge it until a first threshold battery voltage or state of charge is reached. When the threshold battery voltage or state of charge has been reached, the first stage ends, and a second stage commences. In the second stage a constant voltage-constant current (CC-CV) approach is used, in which a constant voltage and a constant current are supplied to the battery to charge it, until a second threshold battery voltage or state of charge is reached, at which point the charging process ends.

To implement a two-stage charging strategy of this kind, the charging circuitry of the device typically includes switched capacitor power converter circuitry to generate the constant voltage required for the first, fast charging stage, and inductive buck converter circuitry to generate the constant voltage and constant current required for the second, CC-CV charging stage.

FIG. 1a is a schematic diagram illustrating an example charging system having charging circuitry including switched-capacitor power converter circuitry and inductive buck converter circuitry.

The charging system in this example (shown generally at 100 in FIG. 1a) includes wireless power receiving circuitry 110, which is configured to receive power from a wireless charging device such as a charging pad, mat or the like, and to output a rectified voltage VRECT. The rectified voltage VRECT may have a magnitude of the order of 15V DC, for example.

The charging system 100 further includes power distribution circuitry 120 configured to receive power from an external source such as a USB (Universal Serial Bus) interface and to output a DC bus voltage VBUS. The DC bus voltage VBUS may have a magnitude of the order of 15V, for example.

The charging system 100 further includes a power management integrated circuit (PMIC) 130, which implements 2-level or 3-level inductive buck converter circuitry for converting the rectified voltage VRECT and the DC bus voltage VBUS to a lower voltage magnitude (e.g. 5V) suitable for charging a battery 150 in a constant voltage-constant current (CC-CV) charging mode. 3-level inductive buck converter circuitry is generally more efficient than 2-level inductive buck converter circuitry, and may thus be preferred for use in the charging system 100 of FIG. 1a.

The PMIC 130 includes a first leakage blocking transistor 132, which in the illustrated example is a MOSFET device having a body diode that blocks reverse current flow from the PMIC 130 to the wireless power receiving circuitry 110. The PMIC 130 further includes a second leakage blocking transistor 134, which in the illustrated example is a MOSFET device having a body diode that blocks reverse current flow from the PMIC 130 to the power distribution circuitry 120. The first and second leakage blocking transistors 132, 134 thus prevent discharge of the battery 150 into the wireless power receiving circuitry 110 or the power distribution circuitry 120.

The PMIC 130 further includes a battery controller transistor 136 (which in the illustrated example is a MOSFET device) which is turned on when the charging system 100 is operating in the CC-CV charging mode to allow current flow from the PMIC 130 to the battery 150. This has the effect of reducing the efficiency of the inductive buck converter circuitry implemented by the PMIC, because some power is dissipated as heat in the on-resistance (e.g. the drain to source resistance) of the battery controller transistor 136.

The charging system 100 further includes switched capacitor power converter circuitry 140 configured to convert the rectified voltage VRECT and the DC bus voltage VBUS to a lower voltage magnitude (e.g. 5V) suitable for charging the battery 150 in a fast charging mode. In contrast to the PMIC 130, in use of the charging system 100, an output node of the switched capacitor power converter circuitry 140 is coupled directly to the battery 150, to prevent unnecessary power losses (as heat) arising from the on resistance (e.g. the drain to source resistance) of the battery controller transistor 136.

The switched capacitor power converter circuitry 140 includes a leakage blocking transistor 142, which in the illustrated example is a MOSFET device having a body device that blocks reverse current flow from the switched capacitor power converter circuitry 140 to the wireless power receiving circuitry 110 and the power distribution circuitry 120, thus preventing discharge of the battery 150 into the wireless power receiving circuitry 110 or the power distribution circuitry 120.

In use, the charging system 100 initially operates in a fast charging mode in which the battery 150 is charged to a first predetermined threshold level (e.g. 80% or 85% of its nominal or rated terminal voltage) by the switched capacitor power converter circuitry 140.

When the battery has reached the first predetermined threshold level, the charging system 100 switches into a CC-CV mode in which the switched capacitor power converter circuitry 140 is turned off or disabled and the PMIC 130 supplies a constant current and constant voltage to the battery 150, via the battery controller transistor 136 (which is turned on).

When the battery 150 has reached a second predefined threshold level (e.g. when the battery 150 has reached its nominal or rated terminal voltage) the battery controller transistor 136 is turned off, such that the PMIC 130 can no longer supply a charging current to the battery 150. Thus, charging of the battery 150 stops.

When the battery 150 is not being charged, leakage from the battery 150 to the wireless power receiving circuitry 110 and/or the power distribution circuitry 120 is prevented by the leakage blocking transistors 132, 134, 142.

The wireless power receiving circuitry 110 includes a coil for wirelessly receiving power from the wireless charging device (charging pad, mat or the like). As will be appreciated, a temperature of the coil is related to the current flowing through it. Thus, to avoid excessive heat dissipation in the coil (which could adversely affect the performance, stability or safety of the battery 150), the current flowing through the coil should be minimised. To achieve this, the switched capacitor power converter circuitry 140 may have a relatively high input voltage to output voltage ratio.

However, the use of a relatively high input voltage to output voltage ratio in the switched capacitor power converter circuitry 140 in the charging system 100 of FIG. 1a prevents integration of the switched capacitor power converter circuitry 140 and the PMIC 130 in a single integrated circuit. Thus, in a typical charging system of the kind shown in FIG. 1a, the PMIC 130 and the switched capacitor power converter circuitry 140 are implemented as separate integrated circuits.

FIG. 1b is a schematic diagram illustrating switched capacitor power converter circuitry suitable for use as the switched capacitor power converter circuitry 140 in the charging system 100 of FIG. 1a.

The switched capacitor power converter circuitry, shown generally at 200 in FIG. 1b, includes a first flying capacitor 210, a second flying capacitor 220 and an output capacitor 230. The switched capacitor power converter circuitry 200 further includes a switch network comprising, in this example, first to seventh switches 242-254 (which in this example are MOSFET devices), which can be selectively opened and closed to couple the first and second flying capacitors 210, 220 to an input node 260 and an output node 270 of the switched capacitor power converter circuitry 200 to generate an output voltage VOUT at a desired magnitude from an input voltage VIN. The switched capacitor power converter circuitry 200 further includes an input switch 280 (which in this example is a MOSFET device) that is operable to activate and deactivate the switched capacitor power converter circuitry 200 by selectively coupling the first switch 242 to, and decoupling the first switch 242 from, the input node 270 at which the input voltage VIN is received.

In this example the switched capacitor power converter circuitry 200 is operable with an input voltage to output voltage ratio of 2:1 or 3:1, such that the magnitude of the output voltage VOUT is either one half of the magnitude of the input voltage or one-third of the magnitude of the input voltage VIN.

As can be seen from FIG. 1b, in this example the switched capacitor power converter circuitry 200 includes seven switches (switches 242-254 of the switch network) for coupling the flying capacitors 210, 220 to the input and output nodes 260, 270, a further switch (input switch 280) for controlling an operational state (activated/deactivated) of the switched capacitor power converter circuitry 200, and three capacitors (first and second flying capacitors 210, 220 and output capacitor 230).

Figure 1C:
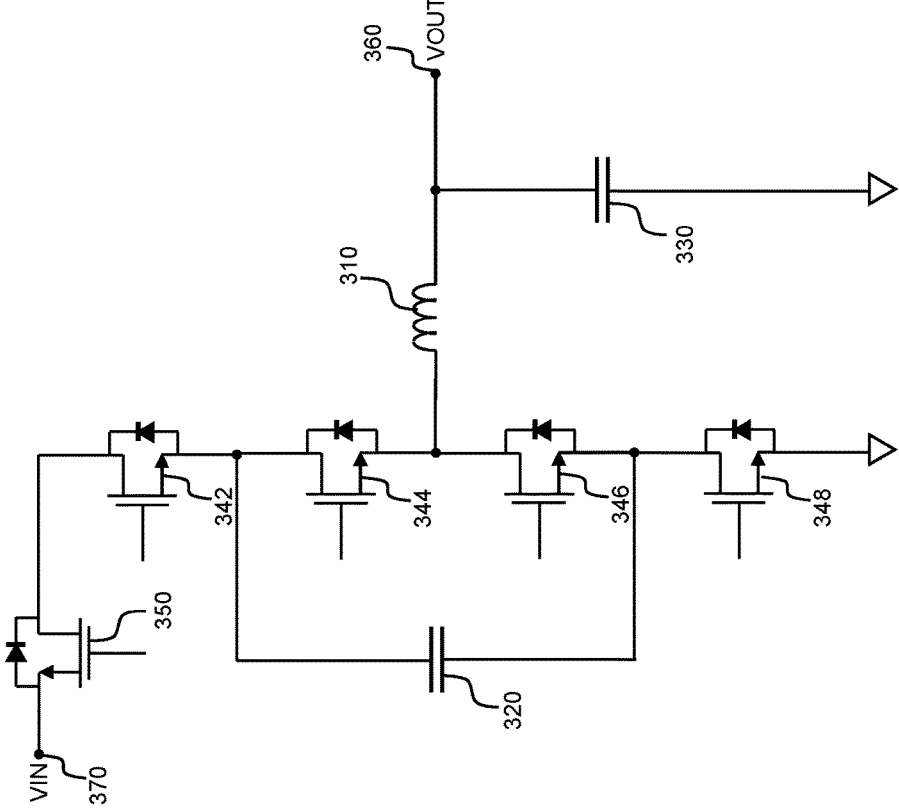
Figure 1C:
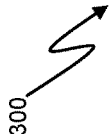

FIG. 1c is a schematic diagram illustrating inductive buck converter circuitry suitable for use as the inductive buck converter circuitry implemented by the PMIC 130 in the system of FIG. 1a.

The inductive buck converter circuitry, shown generally at 300 in FIG. 1c, includes an inductor 310, a flying capacitor 320 and an output capacitor 330. The inductive buck converter circuitry 300 further includes a switch network comprising, in this example, first to fourth switches 342-348 (which in this example are MOSFET devices) for selectively coupling the inductor 310 to the flying capacitor 320 or to an output node 360 of the inductive buck converter circuitry 300. The inductive buck converter circuitry 300 also includes an input switch 350 (which in this example is a MOSFET device) that is operable to activate and deactivate the inductive buck converter circuitry 300 by selectively coupling the first switch 342 to, and decoupling the first switch 342 from, an input node 370 at which the input voltage VIN is received.

As can be seen from FIG. 1c, in this example the inductive buck converter circuitry 300 includes four switches (switches 342-348 of the switch network) for coupling the inductor 310 to the flying capacitor 320 or the output node 360, a further switch (input switch 350) for controlling an operational state (activated/deactivated) of the inductive buck converter circuitry 300, and two capacitors (flying capacitor 320 and output capacitor 330).

Although not shown in FIG. 1c, as those of ordinary skill in the art will be aware, the inductive buck converter circuitry 300 also requires additional control circuitry to ensure that the voltage of the flying capacitor 320 remains balanced.

Thus, in a charging system of the kind shown in FIG. 1a in which the PMIC 130 and the switched capacitor power converter circuitry 140 are provided as separate circuits, a total of thirteen switches and five capacitors are required to implement the inductive buck converter circuitry and the switched capacitor power converter circuitry 140.

Figure 2:
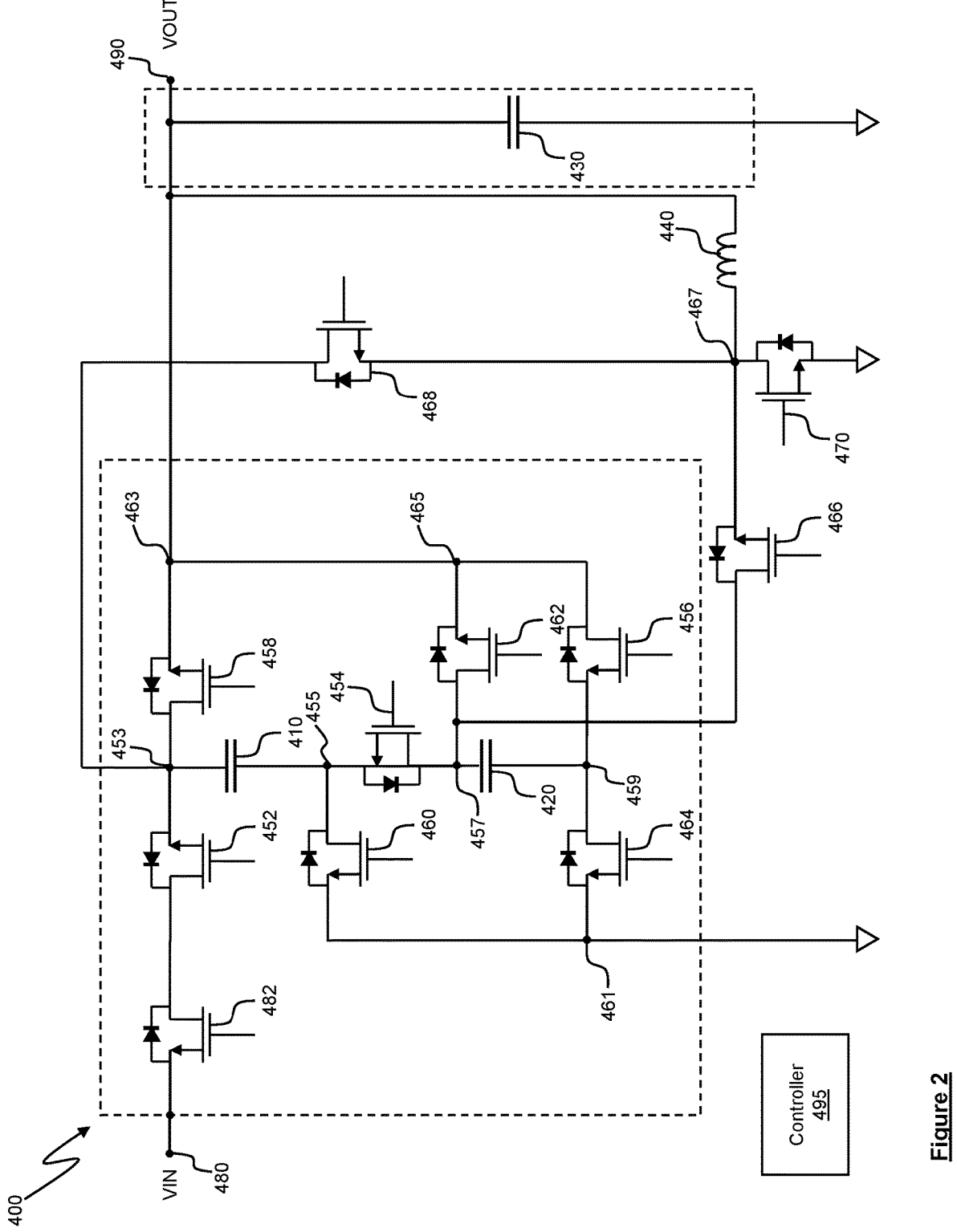
FIG. 2 is a schematic representation of power converter circuitry according to the present disclosure.

FIG. 2 is a schematic representation of power converter circuitry according to the present disclosure, which combines inductive buck converter circuitry and switched capacitor power converter circuitry into a single circuit. The power converter circuitry of the present disclosure may thus be referred to as a combined power converter circuit (or combined power converter circuitry).

The power converter circuitry, shown generally at 400 in FIG. 2, may be implemented in a single integrated circuit device, and is operable in a first forward mode as switched capacitor converter circuitry and in a second forward mode as inductive buck converter circuitry. In the first and second forward modes, the power converter circuitry 400 is operative to step down an input voltage to generate an output voltage.

The power converter circuitry 400 is also operable in a first reverse mode as switched capacitor power converter circuitry, and in a second reverse mode as inductive boost converter circuitry. In the first and second reverse modes, the power converter circuitry 400 is operative to step up an input voltage to generate an output voltage The power converter circuitry 400 in the illustrated example includes first and second flying capacitors 410, 420 (which in some examples are of equal capacitance), an output capacitor 430 (which may be of equal capacitance to the first and second flying capacitors 410, 420), and an inductor 440. In examples where the power converter circuitry is implemented in a single integrated circuit, the first and/or second flying capacitors 410, 420, and/or the output capacitor 430 and/or the inductor 440 may be external to the integrated circuit, i.e. may be provided off-chip.

The power converter circuitry 400 further includes a switch network configured to be coupled to the first and second flying capacitors 410, 420, the output capacitor 430 and the inductor 440. For example, where the power converter circuitry 400 is implemented in a single integrated circuit, the integrated circuit may comprise a first set of one or more terminals (pins, pads, balls or the like) by means of which an external (i.e. off-chip) first flying capacitor 410 can be coupled to a first set of one or more coupling nodes of the switch network. Similarly, the integrated circuit may comprise: a second set of one or more terminals (pins, pads, balls or the like) by means of which an external (i.e. off-chip) second flying capacitor 420 can be coupled to a second set of one or more coupling nodes of the switch network, a third set of one or more terminals (pins, pads, balls or the like) by means of which an external (i.e. off-chip) output capacitor 430 can be coupled to a third set of one or more coupling nodes of the switch network; a fourth set of one or more terminals (pins, pads, balls or the like) by means of which an external (i.e. off-chip) inductor 440 can be coupled to a fourth set of one or more coupling nodes of the switch network. The coupling nodes of the switch network are described in more detail below.

The switch network in the illustrated example comprises first to tenth switches 452-470 (which in this example are MOSFET devices). An input switch 482 (which in this example is a MOSFET device) is coupled between an input node 480 at which an input voltage VIN is received and the switch network. The input switch 482 is operable to activate and deactivate the power converter circuitry 400 by selectively coupling the first switch 452 to, and decoupling the first switch 452 from, the input node 480. An output voltage VOUT is provided at an output node 490 of the power converter circuitry 400.

The power converter circuitry 400 further includes controller circuitry 495, which is configured to control operation of the switches 452-470 of the switch network to cause the power converter circuitry 400 to operate in a desired mode, as described in more detail below. The controller circuitry 495 may be implemented in discrete circuitry or integrated circuitry, or may be implemented by a microprocessor, microcontroller or the like, executing suitable instructions.

As will be apparent from FIG. 2, the power converter circuitry 400 in the example illustrated in FIG. 2 includes a total of eleven switches (although in some examples there may only be ten switches, as the input switch 482 may be omitted, e.g. if a back to back switch is used, externally of the power converter circuitry 400, in an input signal path to the input node 480), three capacitors and one inductor. In contrast, in the charging system 100 of FIG. 1a in which the inductive buck converter circuitry implemented by the PMIC and the switched capacitor power converter circuitry 140 are provided as separate circuits, a total of thirteen switches and five capacitors are required to implement the inductive buck converter circuitry and the switched capacitor power converter circuitry 140. Thus, the power converter circuitry 400 of FIG. 2 requires two fewer switches and two fewer capacitors than the charging system 100 of FIG. 1a.

As shown in FIG. 2, in use of the power converter circuitry 400, a first terminal of the first flying capacitor 410 is coupled to a first node 453 of the switch network, between a source terminal of the first switch 452 and a drain terminal of the fourth switch 458. A second terminal of the first flying capacitor 410 is coupled to a second node 455 of the switch network, between a source terminal of the second switch 454 and a drain terminal of the fifth switch 460. Thus, the first node 453 and the second node 455 of the switch network constitute a set of coupling nodes for the first flying capacitor 410.

A first terminal of the second flying capacitor 420 is coupled to a third node 457 of the switch network, between a drain terminal of the second switch 454 and a drain terminal of the sixth switch 462. A second terminal of the second flying capacitor 420 is coupled to a fourth node 459 of the switch network, between a drain terminal of the seventh switch 464 and a source terminal of the third switch 456. Thus, the third node 457 and the fourth node 459 of the switch network constitute a set of coupling nodes for the second flying capacitor 420.

A source terminal of the fifth switch 460 and a source terminal of the seventh switch 464 are coupled to a fifth node 461 of the switch network, and the fifth node 461 is coupled to a ground (or other reference voltage) supply rail or terminal.

A source terminal of the fourth switch 458 is coupled to a sixth node 463 of the switch network. The sixth node 463 is couped to the output node 490.

A drain terminal of the third switch 456 and a source terminal of the sixth switch 462 are coupled to a seventh node 465 of the switch network. The seventh node 645 is coupled to the sixth node 463.

A first terminal of the inductor 440 is coupled to an eighth node 467 of the switch network, which is also coupled to a source terminal of the eighth switch 466, a source terminal of the ninth switch 468 and a drain terminal of the tenth switch 470. A drain terminal of the eighth switch 466 is coupled to the third node 457 of the switch network.

A second terminal of the inductor 440 is coupled to the output node 490. Thus, the eighth node 467 and the output node 490 of the switch network constitute a set of coupling nodes for the inductor 440. Alternatively, the first terminal of the inductor 440 may be coupled to the eighth node 467 and the second terminal may be coupled, off-chip, to the output node 490, in which case the eighth node 467 constitutes a set of one coupling node for the inductor 440.

A source terminal of the tenth switch 470 is coupled to the ground (or other reference voltage) supply rail or terminal.

The output capacitor 430 is coupled between the output node 490 and the ground (or other reference voltage) supply rail or terminal. Thus, the output node constitutes a set of one coupling node for the output capacitor 430.

As will be appreciated, the combination of the first and second flying capacitors 410, 420, the switch network (specifically the first to seventh switches 452-464 of the switch network) and the output capacitor 430 of the power converter circuitry 400 constitutes switched capacitor power converter circuitry of the kind shown in FIG. 1b, as highlighted by the dashed boxes in FIG. 2.

The combination of the first and second flying capacitors 410, 420, the switch network, the inductor 440 and the output capacitor 430 constitutes inductive buck or inductive boost converter circuitry.

Thus, the power converter circuitry 400 may be said to comprise switched capacitor power converter circuitry and inductive buck or boost converter circuitry, with the switch network, the flying capacitors 410, 420 and the output capacitor being common to or shared by the switched capacitor power converter circuitry and the inductive buck or boost converter circuitry.

As noted above, the power converter circuitry 400 is operable in a first forward mode as switched capacitor power converter circuitry and in a second forward mode as inductive buck converter circuitry. The power converter circuitry is also operable in a first reverse mode as switched capacitor power converter circuitry, and in a second reverse mode as or inductive boost converter circuitry.

When operating in the first forward mode as switched capacitor power converter circuitry, the power converter circuitry 400 can operate in first sub-mode as a forward switched capacitor power converter with a 3:1 input voltage to output voltage ratio and in a second sub-mode as a forward switched capacitor power converter with a 2:1 input voltage to output voltage ratio. In both the first sub-mode and the second sub-mode, the power converter circuitry 400 is operative to supply power to a component coupled to its output node 490, e.g. to supply power to charge a battery. Thus, when operating in the sub-modes of the first forward mode (i.e. in a forward switched capacitor converter mode), the power converter circuitry is operative to generate the output voltage VOUT by applying a substantially integer step-down conversion factor (i.e. the input voltage VIN is an integer multiple of the output voltage VOUT) to the input voltage VIN.

When operating in the second forward mode as inductive buck converter circuitry, the power converter circuitry 400 can operate in a third sub-mode, as a forward 3-level inductive buck converter, or in a fourth sub-mode, as a forward 2-level inductive buck converter. In both the third sub-mode and the fourth sub-mode, the power converter circuitry 400 is operative to supply power to a component coupled to its output node 490, e.g. to supply power to charge a battery. Thus, when operating in the sub-modes of the second forward mode (i.e. in an inductive buck converter mode), the power converter circuitry is operative to generate the output voltage VOUT by applying a substantially non-integer step-down conversion factor (i.e. the input voltage VIN is a non-integer multiple of the output voltage VOUT) to the input voltage VIN.

When operating in the first reverse mode as switched capacitor power converter circuitry, the power converter circuitry 400 can also operate in a fifth sub-mode as a reverse switched capacitor power converter with a 1:3 input voltage to output voltage ratio and in a sixth sub-mode as a reverse switched capacitor power converter with a 1:2 input voltage to output voltage ratio. In both the fifth sub-mode and the sixth sub-mode, the power converter circuitry is operative to supply power from a component such as a battery coupled to its output node 490 to a component or subsystem (e.g. a wireless charging subsystem) coupled to its input node 480. Thus, when operating in the sub-modes of the first reverse mode (i.e. in a reverse switched capacitor converter mode), the power converter circuitry is operative to generate the output voltage VOUT by applying a substantially integer step-up conversion factor (i.e. the output voltage VOUT is an integer multiple of the input voltage VIN) to the input voltage VIN.

When operating in the second reverse mode as inductive boost converter circuitry, the power converter circuitry 400 can operate in a seventh sub-mode, as reverse 3-level inductive boost converter, and in an eighth sub-mode, as a reverse 2-level inductive boost converter. In both the seventh sub-mode and the eighth sub-mode, the power converter circuitry 400 is operative to supply power from a component such as a battery coupled to its output node 490 to a component or subsystem (e.g. a wireless charging subsystem) coupled to its input node 480. Thus, when operating in the sub-modes of the second reverse mode (i.e. in an inductive boost converter mode), the power converter circuitry is operative to generate the output voltage VOUT by applying a non-integer step-up conversion factor (i.e. the output voltage VOUT is a non-integer multiple of the input voltage VIN) to the input voltage VIN.

The ability of the circuitry 400 to apply a substantially integer step-down or step-up conversion factor to the input voltage VIN (when operating in the first forward mode and the first reverse mode, respectively) and to apply a non-integer step-down or step-up conversion factor to the input voltage VIN (when operating in the second forward mode or the second reverse mode, respectively) allows selection between coarse control of the output voltage VOUT (in the first mode) and finer control of the output voltage VOUT (in the second mode) as required by the application in which the circuitry 400 is used. For example, in a battery charger application, coarse control of the output voltage VOUT (as provided by the power converter circuitry 400 in its first mode) may be sufficient for the first, fast charging stage, whereas in the second, CC-CV stage, finer control of the output voltage VOUT (as provided by the power converter circuitry 400 in its second mode) may be required.

Figure 3A:
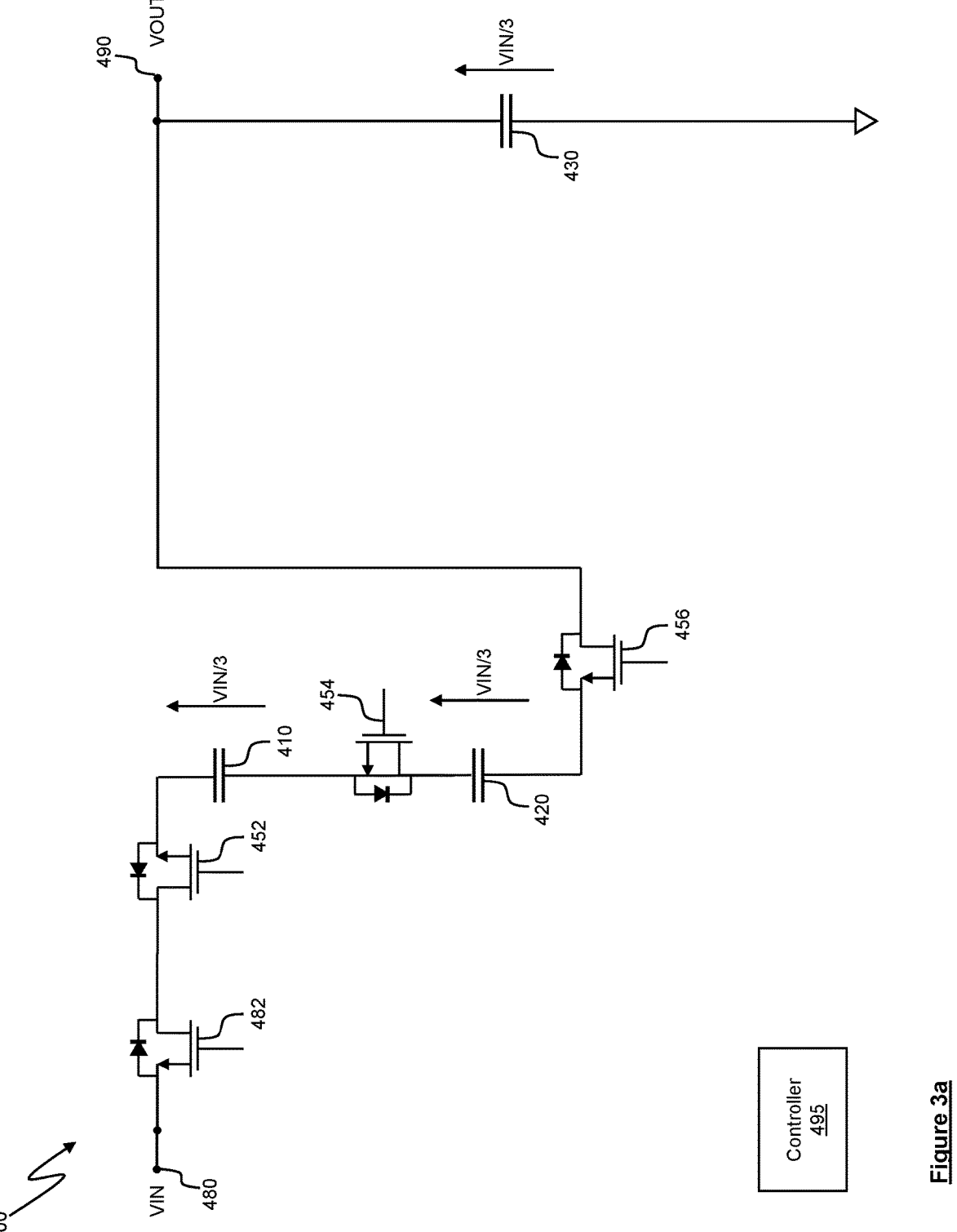
FIGS. 3a and 3b illustrate operation of the circuitry of FIG. 2 as a forward switched capacitor power converter with a 3:1 input voltage to output voltage ratio.
Figure 3B:
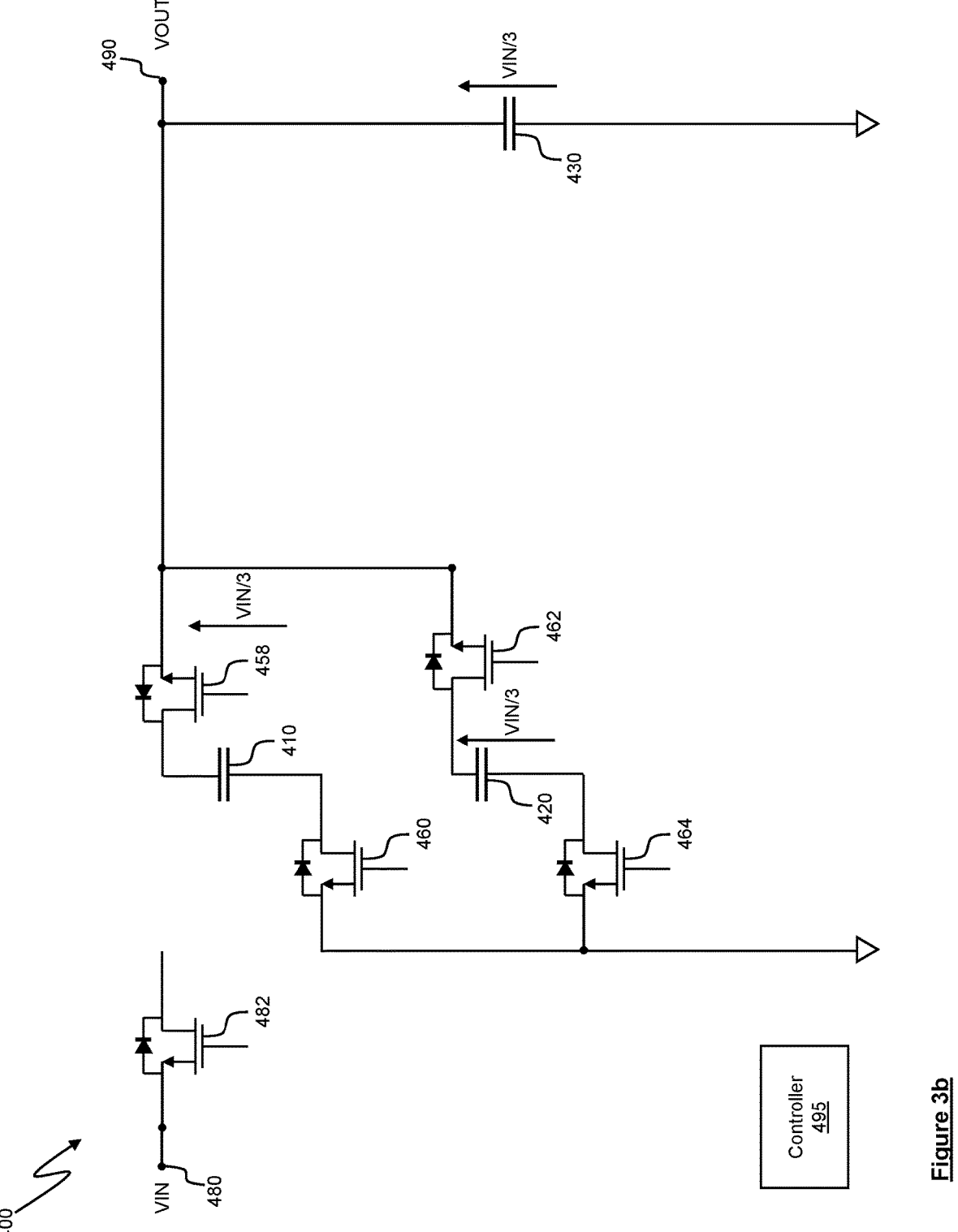

FIGS. 3a and 3b are schematic diagrams illustrating operation of the power converter circuitry 400 in the first forward mode, as switched capacitor circuitry. In FIGS. 3a and 3b the power converter circuitry 400 operates in its first sub-mode as a forward switched capacitor power converter with a 3:1 input voltage to output voltage ratio, i.e. a step-down conversion factor of 3.

In a first phase of operation, shown in FIG. 3a, the input switch 482 and the first, second and third switches 452, 454 and 456 of the switch network are closed (i.e. switched on) in response to suitable control signals from the controller circuitry 495, such that the first and second flying capacitors 410, 420 and the output capacitor 430 are coupled in series between the input node 480 and the ground (or other reference voltage supply) rail or terminal. The other switches 458-470 are open (i.e. switched off), in response to suitable control signals from the controller circuitry 495 (and are thus not shown in FIG. 3a, for the sake of clarity).

Thus, in the first phase of operation in the first sub-mode, the first and second flying capacitors 410, 420 and the output capacitor charge up from the input voltage VIN received at the input node 480. If the first flying capacitor 410, second flying capacitor 420 and output capacitor 430 are of equal capacitance, a voltage of VIN/3 develops across each of the first and second flying capacitors 410, 420 and the output capacitor 430, such that the peak output voltage VOUT at the output node 490 is equal to VIN/3.

In a second phase of operation, shown in FIG. 3b, the first, second and third switches 452, 454, 456 are opened (i.e. switched off) in response to suitable control signals from the controller circuitry 495 (and are thus not shown in FIG. 3b). The fourth, fifth, sixth and seventh switches 458, 460, 462, 464 are closed (i.e. switched on), in response suitable control signals from the controller circuitry 495, such that the first and second flying capacitors 410, 420 and the output capacitor 430 are coupled in parallel between the output node 490 and the ground (or other reference voltage supply) rail or terminal.

The other switches 466-470 are open (i.e. switched off), in response to suitable control signals from the controller circuitry 495 (and are thus also not shown in FIG. 3b, for the sake of clarity).

Thus, in the second phase of operation in the first sub-mode, the peak output voltage VOUT is equal to the voltage that developed across the flying capacitors 410, 420 and the output capacitor 430 during the first phase. Thus, in the case where the first and second flying capacitors 410, 420 and the output capacitor 430 are of equal capacitance, the peak output voltage VOUT in the second phase of operation is VIN/3.

In this example a duty cycle of the switched capacitor power converter implemented by the power converter circuitry 400 is fixed at 0.5, such that the duration of the first phase is equal to half of a total duration of the first and second phases. As a result of this fixed duty cycle no balancing of the voltage of the flying capacitors 410, 420 is required.

Figure 4A:
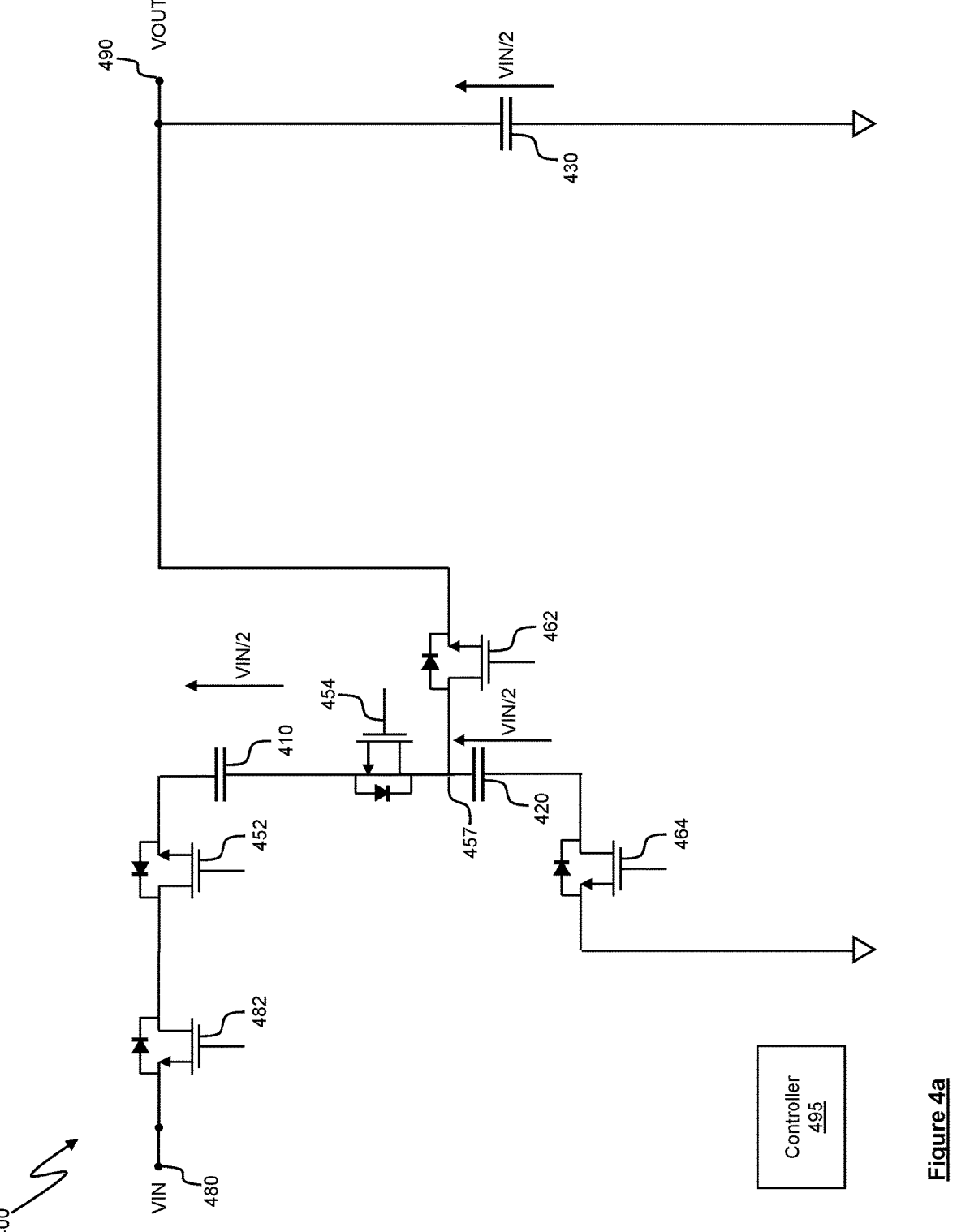
FIGS. 4a and 4b illustrate operation of the circuitry of FIG. 2 as a forward switched capacitor power converter with a 2:1 input voltage to output voltage ratio.
Figure 4B:
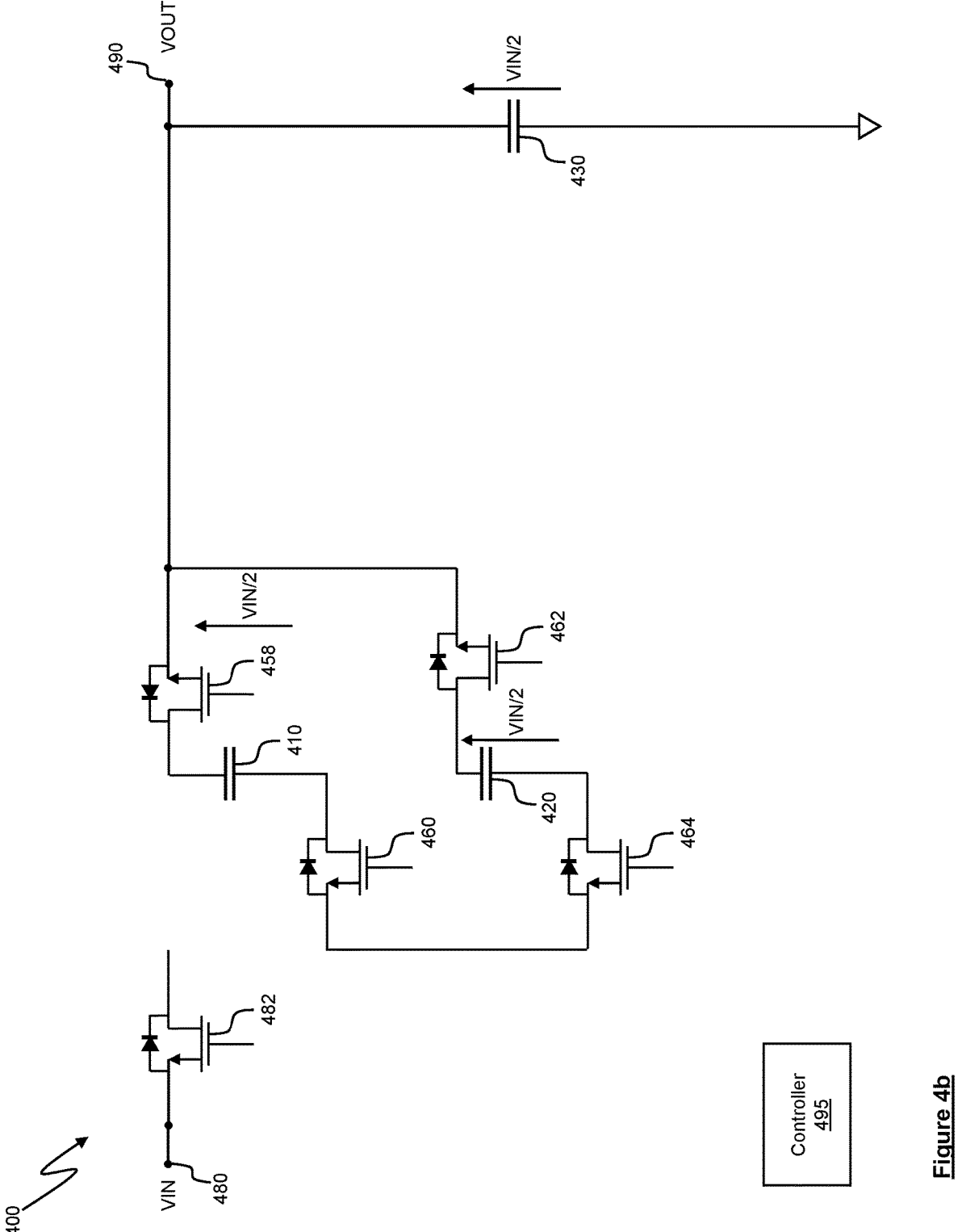

FIGS. 4a and 4b are schematic diagrams illustrating operation of the power converter circuitry 400 in the first forward mode, as switched capacitor circuitry. In FIGS. 4a and 4b the power converter circuitry 400 operates in its second sub-mode as a forward switched capacitor power converter with a 2:1 input voltage to output voltage ratio, i.e. a step-down conversion factor of 2.

In a first phase of operation, shown in FIG. 4a, the input switch 482 and the first, second, sixth and seventh switches 452, 454, 462 and 464 of the switch network are closed (i.e. switched on) in response to suitable control signals from the controller circuitry 495.

With the switch network in this configuration, the first flying capacitor 410 and the second flying capacitor 420 are coupled in series between the input node 480 and the ground (or other reference voltage) supply rail or terminal. Thus, if the first and second flying capacitors 410, 420 are of equal capacitance, a voltage of VIN/2 develops across each of the first and second flying capacitors 410, 420 and the first and second flying capacitors 410, 420 charge up to VIN/2.

The first flying capacitor 410 and the output capacitor 430 are also coupled in series between the input node 480 and the ground (or other reference voltage) supply rail or terminal, since the output node 490 is coupled to the third node 457 of the switch network.

Thus the output voltage VOUT is equal to the voltage VIN/2 at the third node 457. As the output capacitor 430 is coupled between the output node and the ground (or other reference voltage) supply rail or terminal, the output capacitor 430 also charges to VIN/2.

In a second phase of operation, shown in FIG. 4b, the first and second switches 452, 454 are opened (i.e. switched off) in response to suitable control signals from the controller circuitry 495 (and are thus not shown in FIG. 4b). The fourth, fifth, sixth and seventh switches 458, 460, 462, 464 are closed (i.e. switched on), in response to suitable control signals from the controller circuitry 495, such that the first and second flying capacitors 410, 420 and the output capacitor 430 are coupled in parallel between the output node 490 and the ground (or other reference voltage supply) rail or terminal. The other switches 466-470 are open (i.e. switched off), in response to suitable control signals from the controller circuitry 495 (and are thus also not shown in FIG. 4b, for the sake of clarity).

Thus, in the second phase of operation in the second sub-mode, the peak output voltage VOUT is equal to the voltage that developed across the flying capacitors 410, 420 and the output capacitor 430 during the first phase, and so the peak output voltage VOUT in the second phase of operation is VIN/2.

In an alternative approach, the seventh switch 464 may be opened (i.e. switched off) in the first and second phases, in response to suitable control signals from the controller circuitry 495.

In this approach, in the first phase the first flying capacitor 410 and the output capacitor 430 are coupled in series between the input node 480 and the ground (or other reference voltage supply) rail or terminal, such that a voltage VIN/2 develops across both the first flying capacitor 410 and the output capacitor 430 and the output voltage VOUT is equal to VIN/2.

In the second phase, the first flying capacitor 410 is coupled in parallel with the output capacitor 430, and the peak output voltage VOUT is equal to the voltage that developed across the first flying capacitor 410 and the output capacitor 430 during the first phase, and so the peak output voltage VOUT in the second phase of operation is VIN/2.

FIGS. 5a-5d are schematic diagrams illustrating operation of the power converter circuitry 400 in the second forward mode as inductive buck converter circuitry. In FIGS. 5a-5d the power converter circuitry 400 operates in its third sub-mode as a forward 3-level inductive buck converter with a duty cycle (D) of less than 0.5. In this mode the power converter circuitry may apply a non-integer step-down conversion factor to the input voltage VIN to generate the output voltage VOUT.

For inductive buck converter circuitry, the duty cycle is defined as the ratio of the on-time of the switch(es) that control a supply of current to the inductor 440 to the total duration of an operational cycle of the inductive buck converter circuitry. Thus, for a duty cycle of less than 0.5, the on-time of the switch(es) that control the supply of current to the inductor 440 is less than half the total duration of an operational cycle of the inductive buck converter circuitry. The duty cycle defines a relationship between the output voltage VOUT and the input voltage VIN of the inductive buck converter circuitry, as D=VOUT/VIN.

Figure 5A:
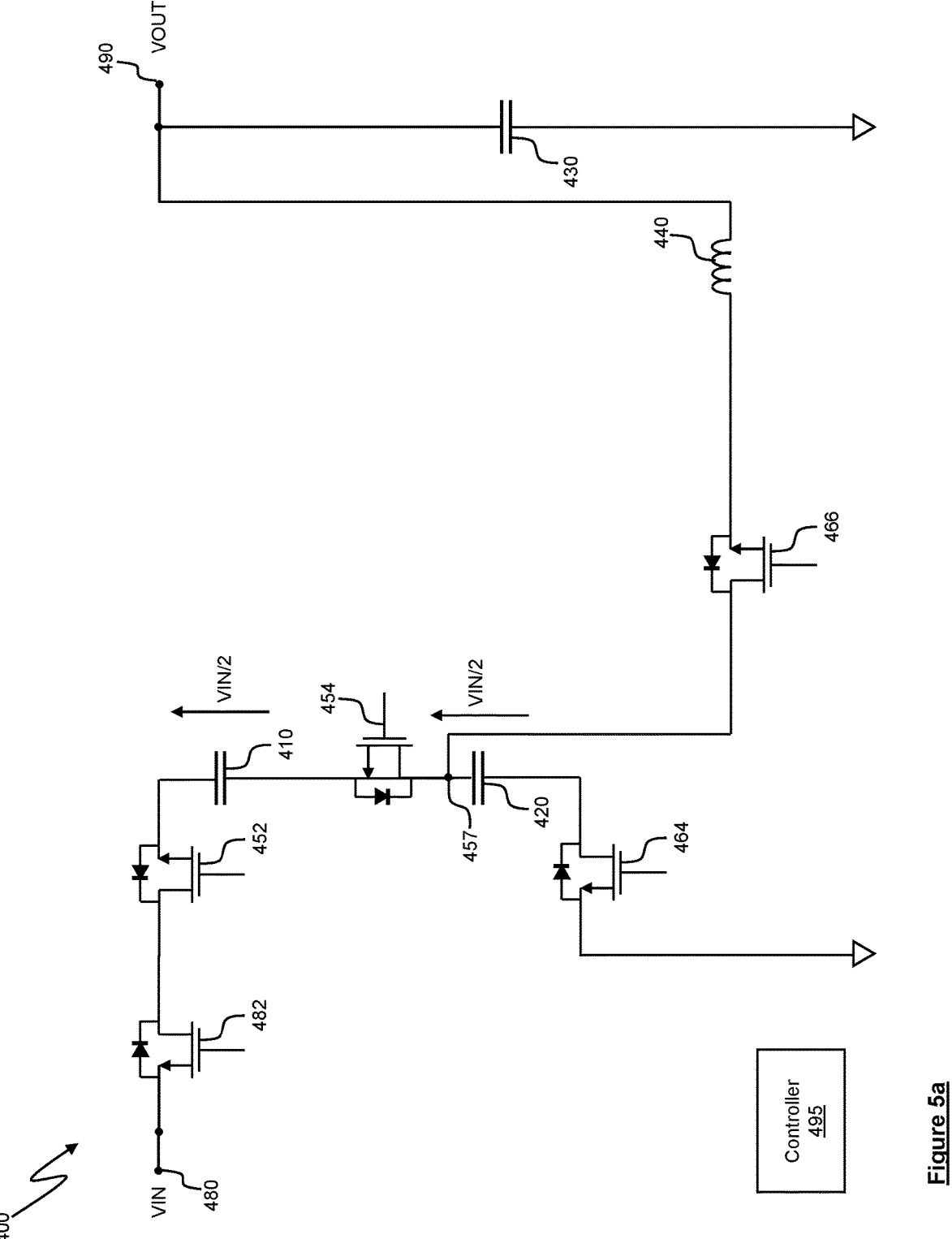
FIGS. 5a-5d illustrate operation of the circuitry of FIG. 2 as a forward 3-level inductive buck converter with a duty cycle of less than 0.5.

In a first phase of operation in the third sub-mode, shown in FIG. 5a, the input switch 482 and the first, second, seventh and eighth switches 452, 454, 464 and 466 of the switch network are closed (i.e. switched on) in response to suitable control signals from the controller circuitry 495, such that the first and second flying capacitors 410, 420 are coupled in series between the input node 480 and the ground (or other reference voltage supply) rail or terminal, the inductor 440 is coupled between the third node 457 of the switch network and the output node 490, and the output capacitor 430 is coupled between the output node 490 and the ground (or other reference voltage supply) rail or terminal. Thus, in this phase of operation, the first flying capacitor 410 and the inductor 440 are coupled in series between the input node 480 and the output node 490.

The flying capacitors 410, 420 charge up and a voltage of VIN/2 develops across both the first flying capacitor 410 and the second flying capacitor 420. Current through the inductor 440 increases and flows to a load (e.g. a battery 150) coupled to the output node 490, and to the output capacitor 430. A voltage VOUT, which is less than VIN/2 (because the voltage across the output capacitor 430 cannot increase instantaneously and because the inductor 440 limits the charging current that is supplied to the output capacitor 430), develops at the output node 490.

It will be noted that no separate flying capacitor is required when the power converter circuitry 400 operates in its second mode as an inductive buck converter, because the flying capacitors 410, 420 that are used when the power converter circuitry 400 is operating in its first mode as a switched capacitor power converter are also used when the power converter circuitry 400 is operating in its second mode as an inductive buck converter.

Figure 5B:
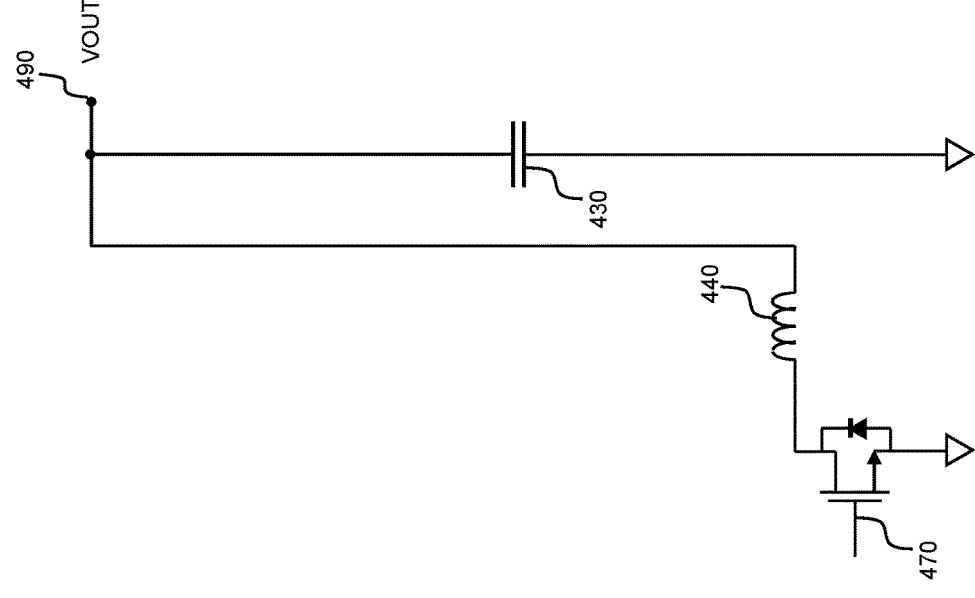
Figure 5B:
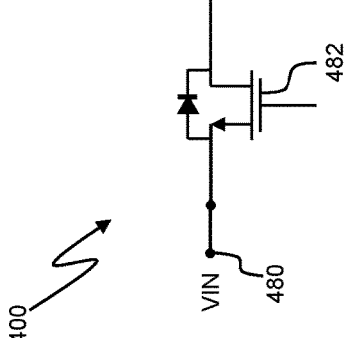

In a second phase of operation in the third sub-mode, shown in FIG. 5b, the tenth switch 470 of the switch network is closed (i.e. switched on) and the other switches 452-468 of the switch network are opened (i.e. switched off) in response to suitable control signals from the controller circuitry 495.

With the switch network in this configuration, the inductor 440 is coupled between the ground (or other reference voltage supply) rail or terminal and the output node 490, in parallel with the output capacitor 430. Thus, in the second phase of operation the inductor 440 receives no input voltage.

The current through the inductor 440 thus decreases, flowing to the load that is coupled to the output node 490. The output capacitor 430 also discharges into the load during this phase, such that the total current supplied to the load is the sum of the inductor current and the output capacitor current.

Figure 5C:
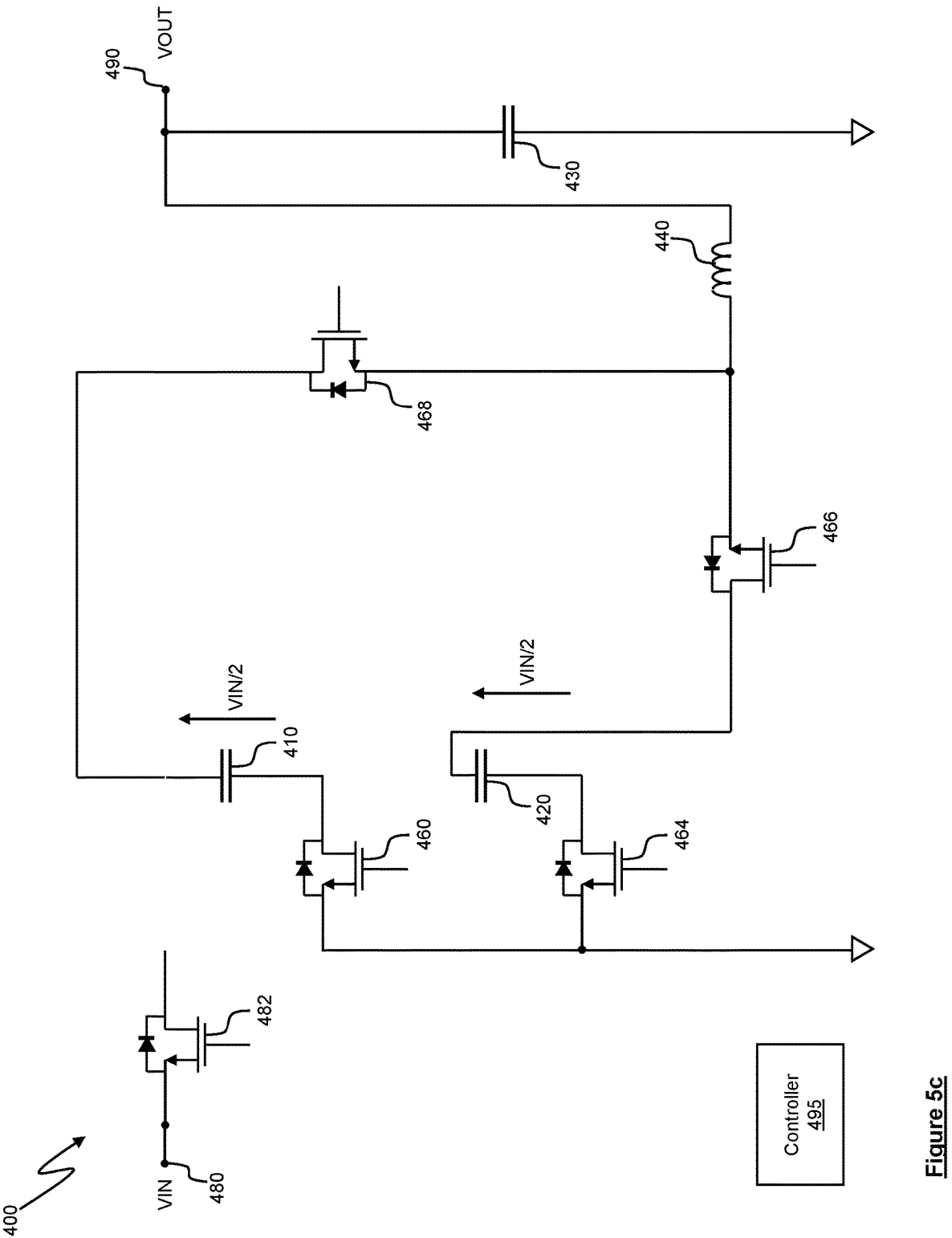

In a third phase of operation in the third sub-mode, shown in FIG. 5c, the fifth, seventh, eighth and ninth switches 460, 464, 466, 468 are closed (i.e. switched on) and the other switches 452-458, 462 and 470 are opened (i.e. switched off) in response to suitable control signals from the controller circuitry 495.

With the switch network in this configuration, the first and second flying capacitors 410, 420 are coupled in parallel with each other between the ground (or other reference voltage supply) rail or terminal and the first terminal of the inductor 440. The first and second flying capacitors 410, 420 are also coupled in parallel with the output capacitor 430, via the inductor 440.

The voltage VIN/2 across both the first and second flying capacitors 410, 420 is thus supplied to the inductor 440, causing current through the inductor 440 to increase again, charging the output capacitor 430 and supplying the load that is coupled to the output node with a voltage VOUT, which is smaller than VIN/2, in the same manner as in the first phase.

Figure 5D:
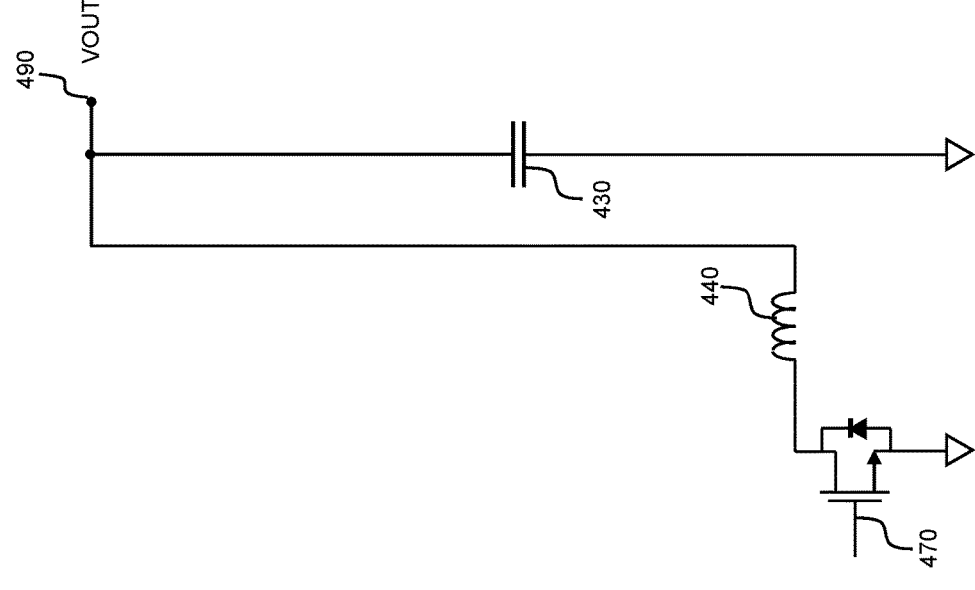
Figure 5D:
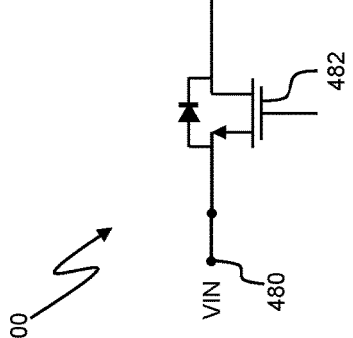

In a fourth phase of operation in the third sub-mode, shown in FIG. 5d, the tenth switch 470 of the switch network is closed (i.e. switched on) and the other switches 452-468 of the switch network are opened (i.e. switched off) in response to suitable control signals from the controller circuitry 495, such that the switch network adopts the same configuration as in the second phase. Thus, in the fourth phase of operation in the third sub-mode, the current through the inductor 440 again decreases, flowing to the load that is coupled to the output node 490. The output capacitor 430 also discharges into the load during this phase, such that the total current supplied to the load is the sum of the inductor current and the output capacitor current.

As will be appreciated by those of ordinary skill in the art, over a complete operational cycle (where a complete operational cycle comprises the first to fourth phases of operation) of the power converter circuitry 400 when operating in the third sub-mode as a forward 3-level inductive boost converter with a duty cycle less than 0.5, the average output voltage VOUT will be less than VIN/2.

The repeated operation of the power converter circuitry 400 in the first and third phases leads to balancing of the voltage of the second flying capacitor 420, such that no separate control of the voltage of the second flying capacitor 420 is not required, in contrast to the charging system 100 of FIG. 1a, where balancing of the voltage of the flying capacitor 320 of the inductive buck converter circuitry 300 must be performed by separate circuitry.

FIGS. 6a-6d are schematic diagrams illustrating operation of the power converter circuitry 400 in the second forward mode as inductive buck converter circuitry. In FIGS. 6a-6d the power converter circuitry 400 operates in its third sub-mode as a forward 3-level inductive buck converter with a duty cycle greater than 0.5.

Figure 6A:
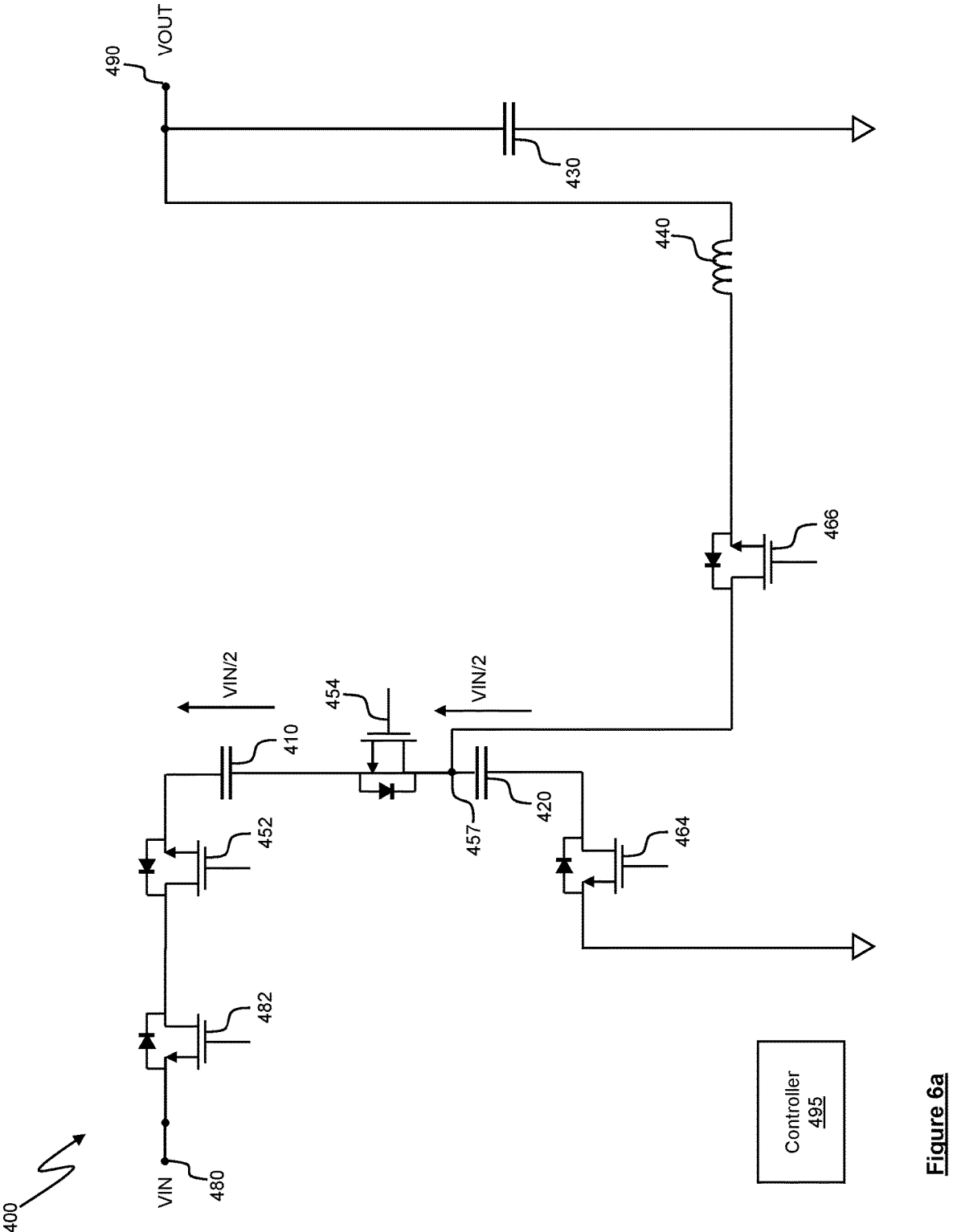
FIGS. 6a-6d illustrate operation of the circuitry of FIG. 2 as a forward 3-level inductive buck converter with a duty cycle greater than 0.5.

In a first phase of operation, shown in FIG. 6a, the switch network adopts the same configuration as in the first phase of operation when the duty ratio is less than 0.5 (shown in FIG. 5a), with the input switch 482 and the first, second, seventh and eighth switches 452, 454, 464 and 466 of the switch network are closed (i.e. switched on) in response to suitable control signals from the controller circuitry 495, such that the first and second flying capacitors 410, 420 are coupled in series between the input node 480 and the ground (or other reference voltage supply) rail or terminal, the inductor 440 is coupled between the third node 457 of the switch network and the output node 490, and the output capacitor 430 is coupled between the output node 490 and the ground (or other reference voltage supply) rail or terminal. Thus, in this phase of operation, the first flying capacitor 410 and the inductor 440 are coupled in series between the input node 480 and the output node 490.

The flying capacitors 410, 420 charge up and a voltage of VIN/2 develops across both the first flying capacitor 410 and the second flying capacitor 420. Current through the inductor 440 increases and flows to a load (e.g. a battery 150) coupled to the output node 490, and to the output capacitor 430.

As in the example illustrated in FIGS. 5a-5d, no separate flying capacitor is required when the power converter circuitry 400 operates in its second mode as an inductive buck converter, because the flying capacitors 410, 420 that are used when the power converter circuitry 400 is operating in its first mode as a switched capacitor power converter are also used when the power converter circuitry 400 is operating in its second mode as an inductive buck converter.

Figure 6B:
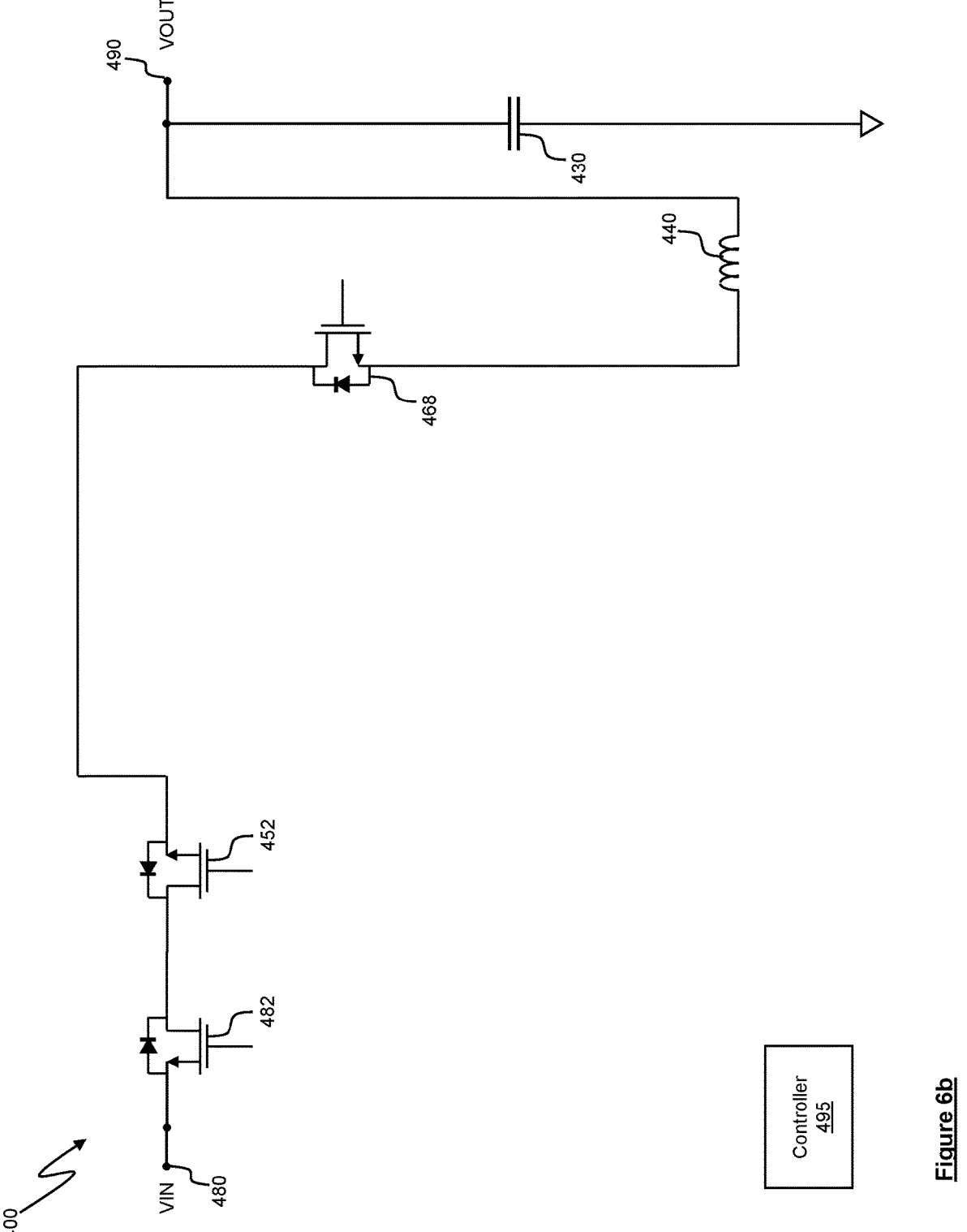

In a second phase of operation, shown in FIG. 6b, the first switch 452 and the ninth switch 468 of the switch network are closed (i.e. switched on) and the other switches 454-466 and 470 are opened (i.e. switched off) in response to suitable control signals from the controller circuitry 495.

With the switch network in this configuration, the inductor 440 is coupled in series between the input node 480 and the output node 490, and the output capacitor 430 is coupled in series between the inductor 440 and the ground (or other reference voltage supply) rail or terminal. Current through the inductor 440 thus continues to increase, and to flow to both the output capacitor 430 and to the load that is coupled to the output node 490, thus supplying the load with an output voltage VOUT which is greater than VIN/2.

Figure 6C:
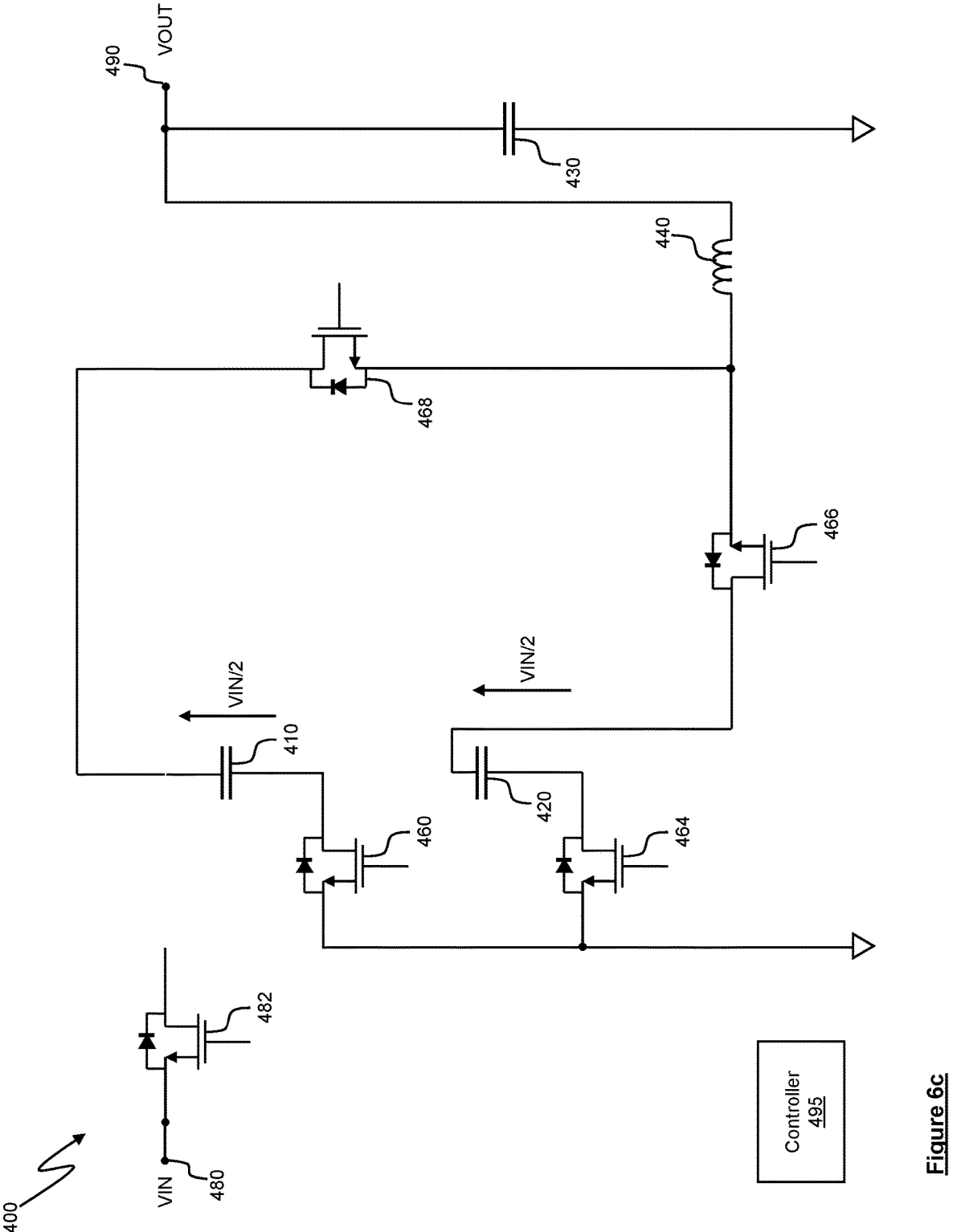

In a third phase of operation, shown in FIG. 6c, the switch network adopts the same configuration as in the third phase of operation when the duty ratio is less than 0.5, with the fifth, seventh, eighth and ninth switches 460, 464, 466, 468 closed (i.e. switched on) and the other switches 452-458, 462 and 470 are opened (i.e. switched off) in response to suitable control signals from the controller circuitry 495.

With the switch network in this configuration, the first and second flying capacitors 410, 420 are coupled in parallel with each other between the ground (or other reference voltage supply) rail or terminal and the first terminal of the inductor 440. The first and second flying capacitors 410, 420 are also coupled in parallel with the output capacitor 430, via the inductor 440.

The voltage VIN/2 across both the first and second flying capacitors 410, 420 is thus supplied to the inductor 440, causing an increasing current to flow through the inductor 440 to the load that is coupled to the output node. In this phase, current may also flow from the output capacitor 430 to the load to supply the load with a voltage VOUT that is greater than VIN/2.

Figure 6D:
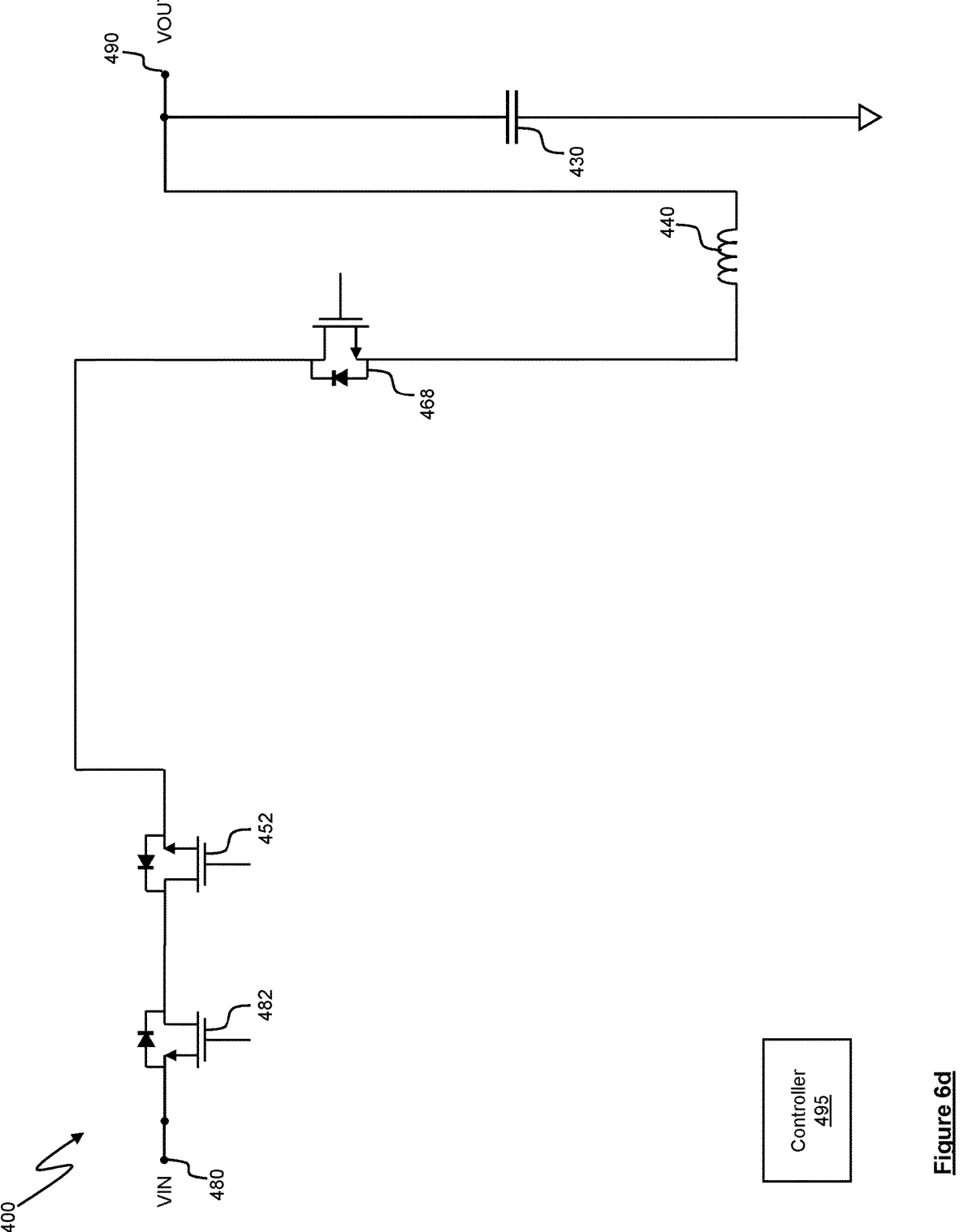

In a fourth phase of operation in the third sub-mode, shown in FIG. 6d, the first switch 452 and the ninth switch 468 of the switch network are closed (i.e. switched on) and the other switches 454-466 and 470 are opened (i.e. switched off) in response to suitable control signals from the controller circuitry 495, such that the switch network adopts the same configuration as in the second phase. Thus, in the fourth phase of operation, an increasing current flows through the inductor 440 to the output capacitor 430 and to the load that is coupled to the output node 490, to supply an output voltage VOUT to the load.

As will be appreciated by those of ordinary skill in the art, over a complete operational cycle (where a complete operational cycle comprises the first to fourth phases of operation) of the power converter circuitry 400 when operating in the third sub-mode as a forward 3-level inductive buck converter with a duty cycle greater than 0.5, the average output voltage VOUT will be greater than VIN/2.

As in the example illustrated in FIGS. 5a-5d, the repeated operation of the power converter circuitry 400 in the first and third phases illustrated in FIGS. 6a and 6c leads to balancing of the voltage of the second flying capacitor 420, such that no separate control of the voltage of the second flying capacitor 420 is not required, in contrast to the charging 100 of FIG. 1a, where balancing of the voltage of the flying capacitor 320 of the inductive buck converter circuitry 300 must be performed by separate circuitry.

Figure 6E:
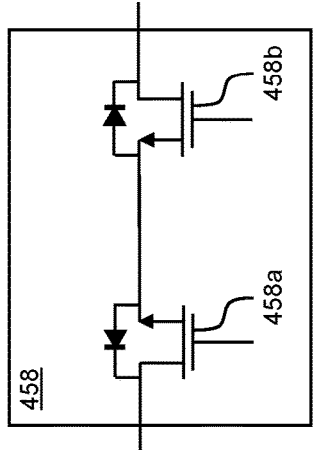
FIG. 6e illustrates switch arrangements for switches in the circuitry of FIG. 2 when the circuitry is used as a forward 3-level inductive buck converter.
Figure 6E:
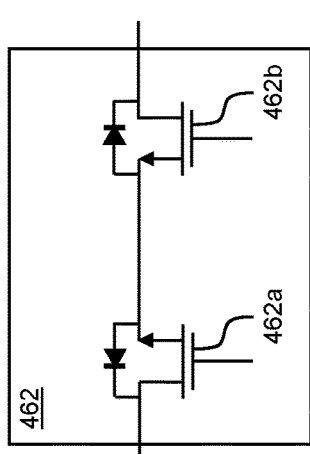

In the example illustrated in FIGS. 6a-6d, the output voltage VOUT is greater than the voltage across the second flying capacitor 420. To prevent conduction by MOSFET body diodes of the fourth and sixth switches 458, 462, if the power converter circuitry 400 is to be used as a forward 3-level inductive buck converter with a duty ratio greater than 0.5, then the fourth and sixth switches 458, 462 may each be implemented using a pair of back to back MOSFET devices as shown in FIG. 6e.

Thus, the fourth switch 458 may be implemented by a combination of a first MOSFET device 458a and a second MOSFET device 458b, with source terminals of the first and second MOSFET devices 458a, 458b being coupled together such that, in the illustrated example, an anode of a body diode of the first MOSFET device 458a is coupled to an anode of a body diode of the second MOSFET device 458b. Similarly, the sixth switch 462 may be implemented by a combination of a first MOSFET device 462a and a second MOSFET device 462b, with source terminals of the first and second MOSFET devices 462a, 462b being coupled together such that an anode of a body diode of the first MOSFET device 462a is coupled to an anode of a body diode of the second MOSFET device 462b. As will be appreciated by those of ordinary skill in the art, in other examples the switches 458a and 458b may be connected so that the direction of the body diode is reversed, in comparison with the example of FIG. 6e, according to the structure of the gate driver for driving the switches. The same is true for the switches 458a and 458b.

Figure 7A:
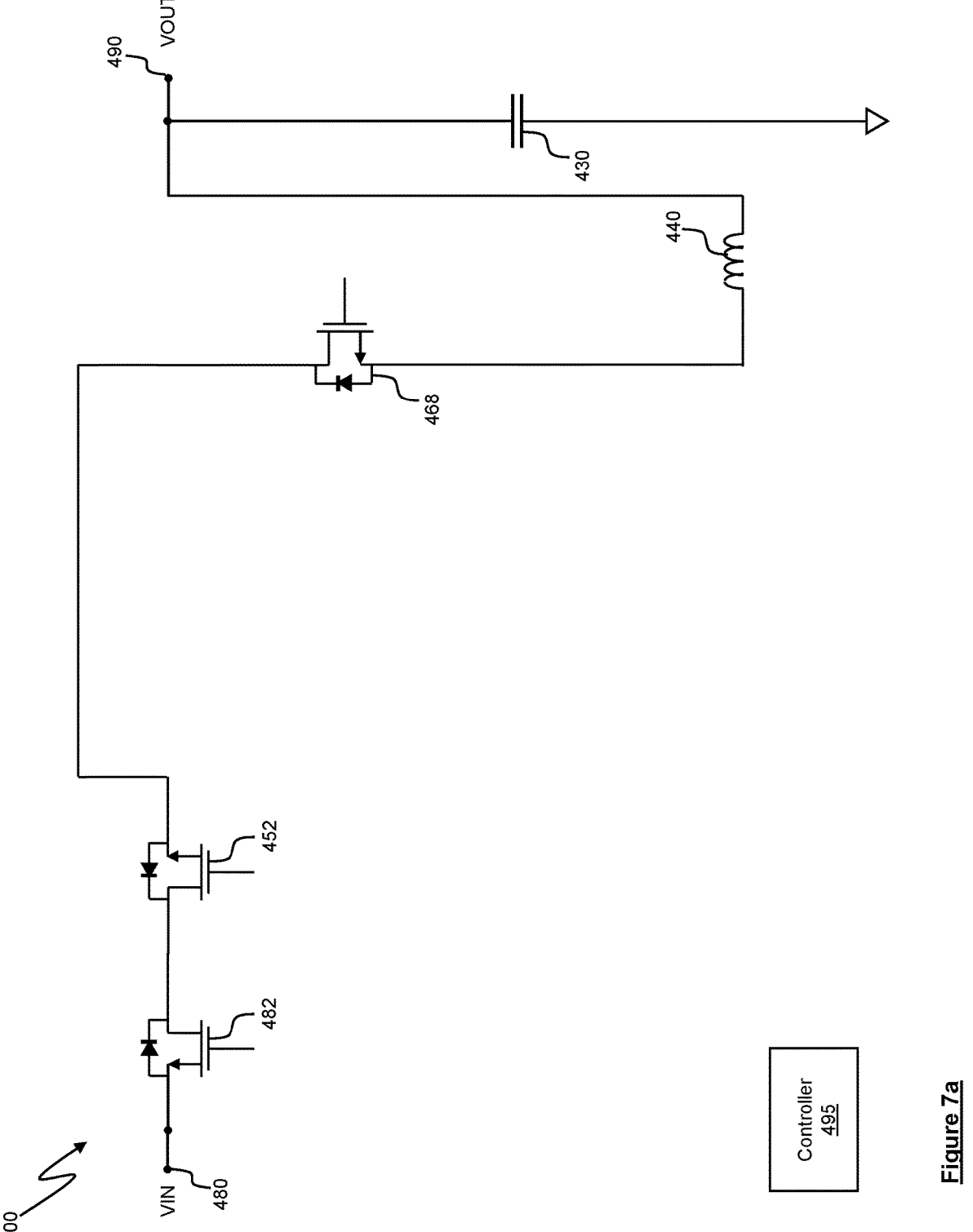
FIGS. 7a and 7b illustrate operation of the circuitry of FIG. 2 as a forward 2-level inductive buck converter.
Figure 7B:
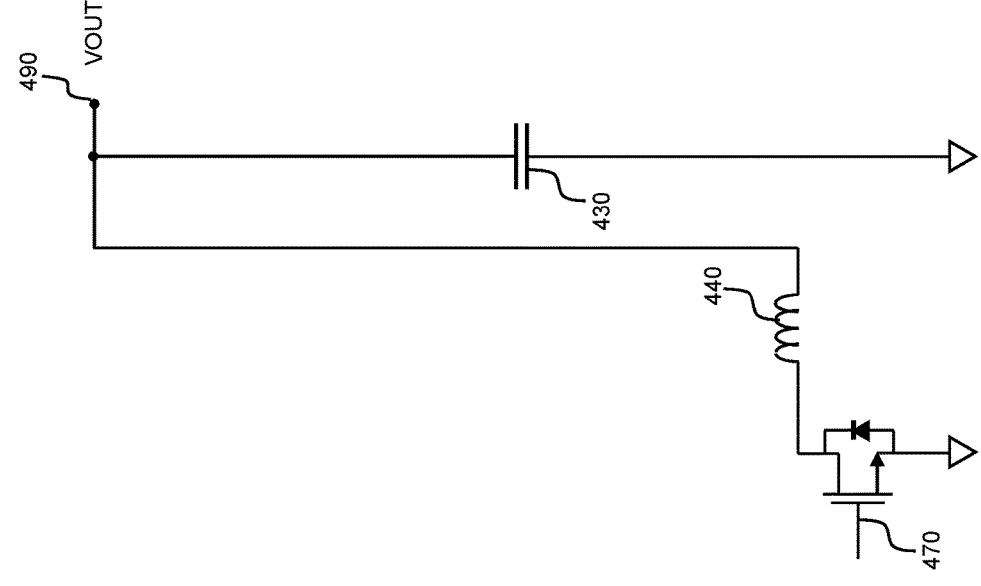
Figure 7B:
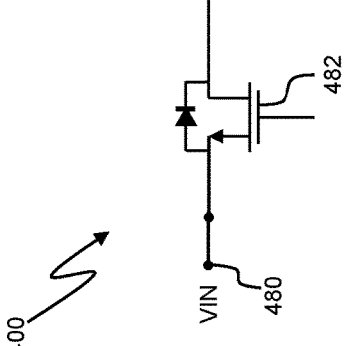
Figure 7B:

FIGS. 7a-7b are schematic diagrams illustrating operation of the power converter circuitry 400 in the second forward mode as inductive buck converter circuitry. In FIGS. 7a-7b the power converter circuitry 400 operates in its fourth sub-mode as a forward 2-level inductive buck converter. In this mode the power converter circuitry may apply a non-integer step-down conversion factor to the input voltage VIN to generate the output voltage VOUT.

In a first phase of operation, shown in FIG. 7a, the switch network adopts the same configuration as shown in FIGS. 6b and 6d, with the first switch 452 and the ninth switch 468 being closed (i.e. switched on) and the other switches 454-466 and 470 being opened (i.e. switched off) in response to suitable control signals from the controller circuitry 495.

With the switch network in this configuration, the inductor 440 is coupled in series between the input node 480 and the output node 490, and the output capacitor 430 is coupled in series between the inductor 440 and the ground (or other reference voltage supply) rail or terminal. An increasing current thus flows through the inductor 440 to the output capacitor 430 and to the load that is coupled to the output node 490, thus supplying the load with a voltage VOUT.

In a second phase of operation, shown in FIG. 7b, the switch network adopts the same configuration as is shown in FIGS. 5b and 5d, with the tenth switch 470 being closed (i.e. switched on) and the other switches 452-468 of the switch network being opened (i.e. switched off) in response to suitable control signals from the controller circuitry 495.

With the switch network in this configuration, the inductor 440 is coupled between the ground (or other reference voltage supply) rail or terminal and the output node 490, in parallel with the output capacitor 430. A decreasing current thus flows through the inductor 440 to the load that is coupled to the output node 490, and the output capacitor 430 also discharges into the load, such that an output voltage VOUT is supplied to the load.

Figure 8A:
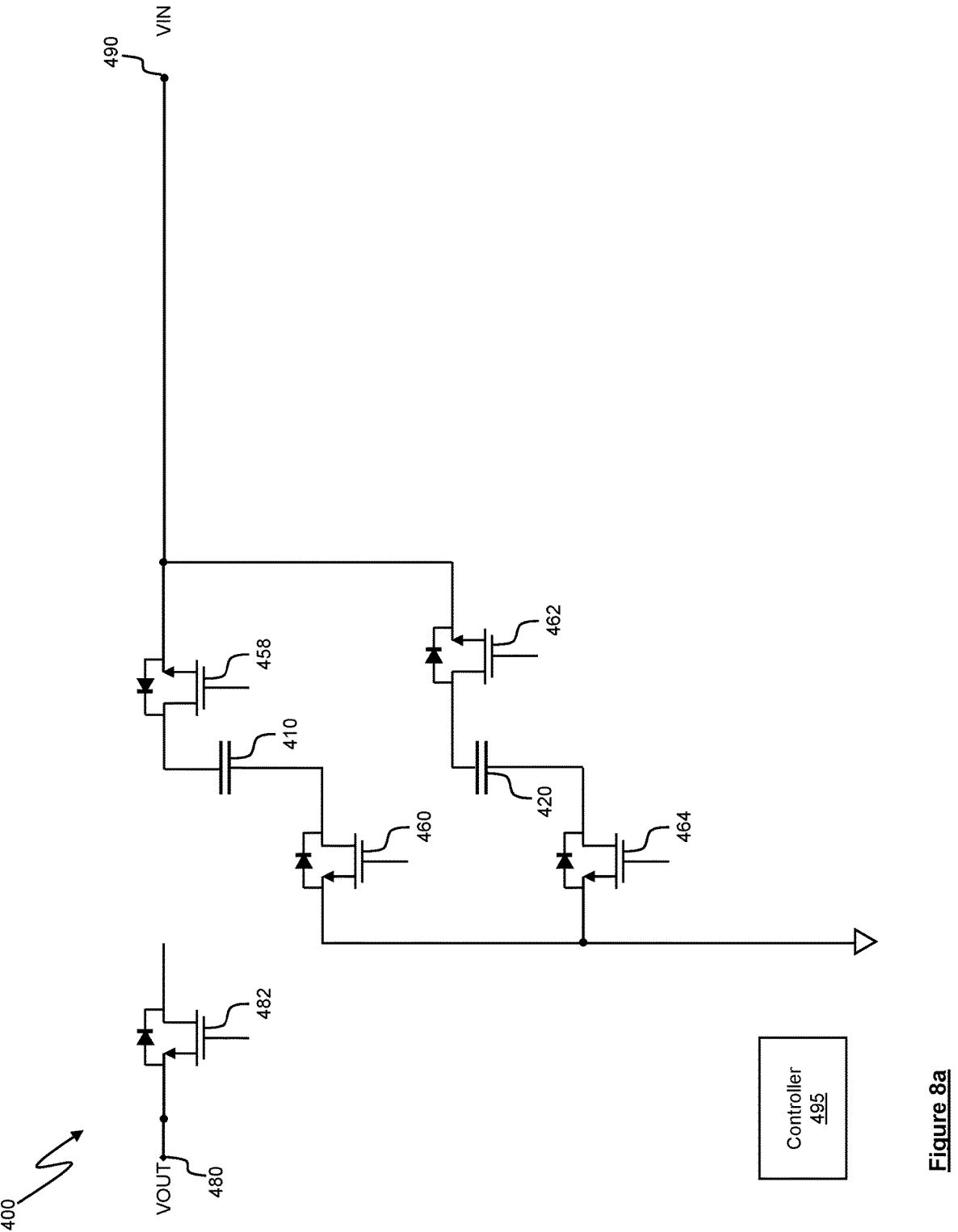
FIGS. 8a and 8b illustrate operation of the circuitry of FIG. 2 as a reverse switched capacitor power converter with a 1:3 input voltage to output voltage ratio.
Figure 8B:
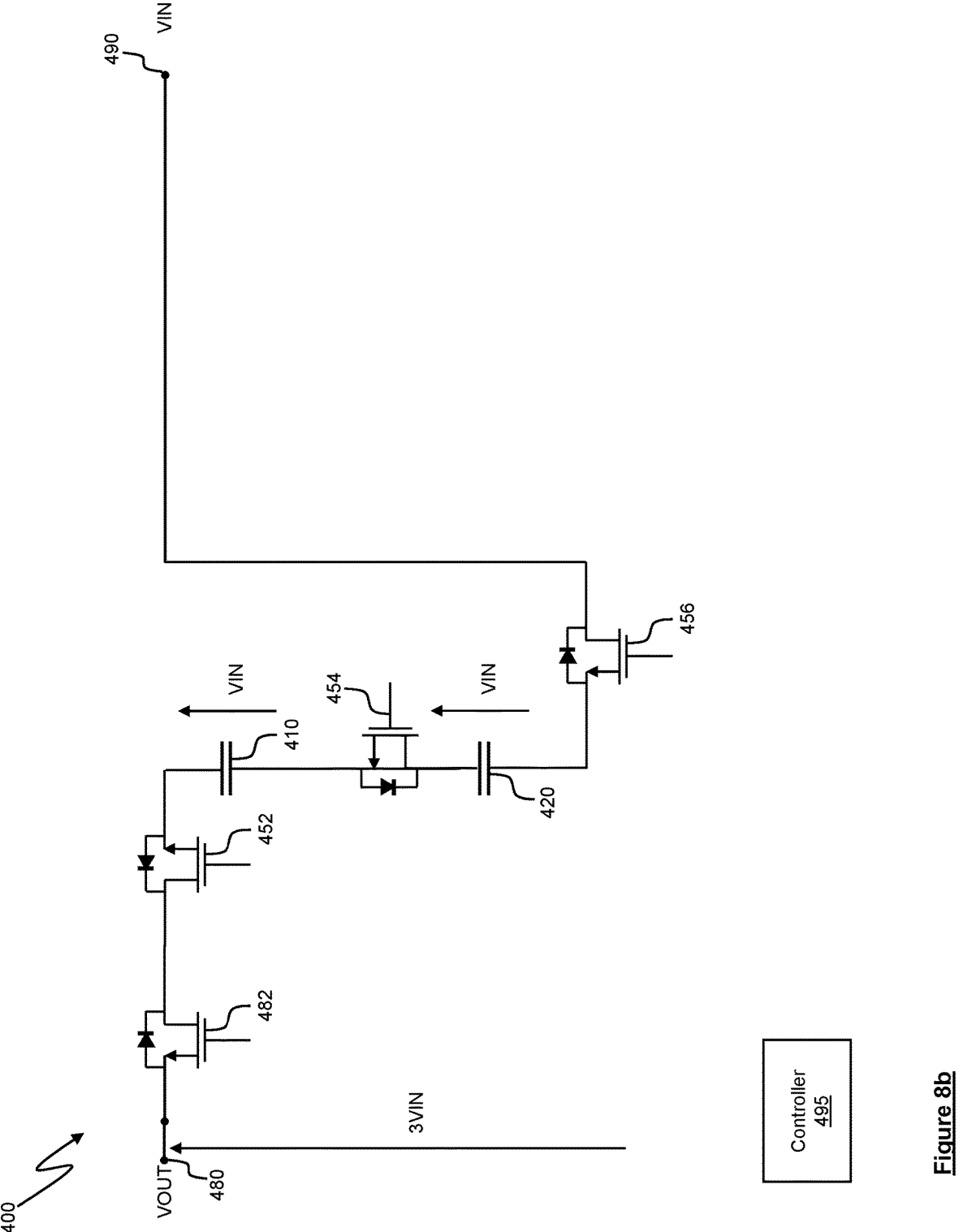

FIGS. 8a-8b are schematic diagrams illustrating operation of the power converter circuitry 400 in the first reverse mode as switched capacitor circuitry. In FIGS. 8a-8b the power converter circuitry 400 operates in its fifth sub-mode as a reverse switched capacitor power converter with a 1:3 input voltage to output voltage ratio (i.e. a step-up conversion factor of 3), to convert an input voltage VIN received at the output node 490 into a higher output voltage VOUT at the input node 480.

In a first phase of operation, shown in FIG. 8a, the fourth, fifth, sixth and seventh switches 458-464 are closed (i.e. switched on) in response to suitable control signals from the controller circuitry 495, such that the first and second flying capacitors 410, 420 are coupled in parallel with each other, between the output node 490 (at which the input voltage VIN is received, e.g. from a battery, in this sub-mode) and the ground (or other reference voltage supply) rail or terminal, such that the first and second flying capacitors 410, 420 charge up to the input voltage VIN.

In a second phase of operation, shown in FIG. 8b, the first, second and third switches 452, 454 and 456 of the switch network are closed (i.e. switched on) in response to suitable control signals from the controller circuitry 495, such that the first and second flying capacitors 410, 420 are coupled in series between the output node 490 of the power converter circuitry 400 (at which the input voltage VIN is received, e.g. from a battery, in this sub-mode) and the input node 480 of the power converter circuitry 400 (at which the output voltage 400 is supplied, in this sub-mode).

The other switches 458-470 are open (i.e. switched off), in response to suitable control signals from the controller circuitry 495.

Thus, in the second phase of operation the first and second flying capacitors 410, 420 act as additional voltage sources in series with the input voltage VIN, such that the voltages of the first and second flying capacitors 410, 420 combine with the input voltage VIN received at the output node 490 to generate the output voltage VOUT. As the first and second flying capacitors 410, 420 were both charged to the input voltage VIN during the first phase of operation, the output voltage VOUT at the input node 480 in the second phase of operation is 3VIN.

Figure 9A:
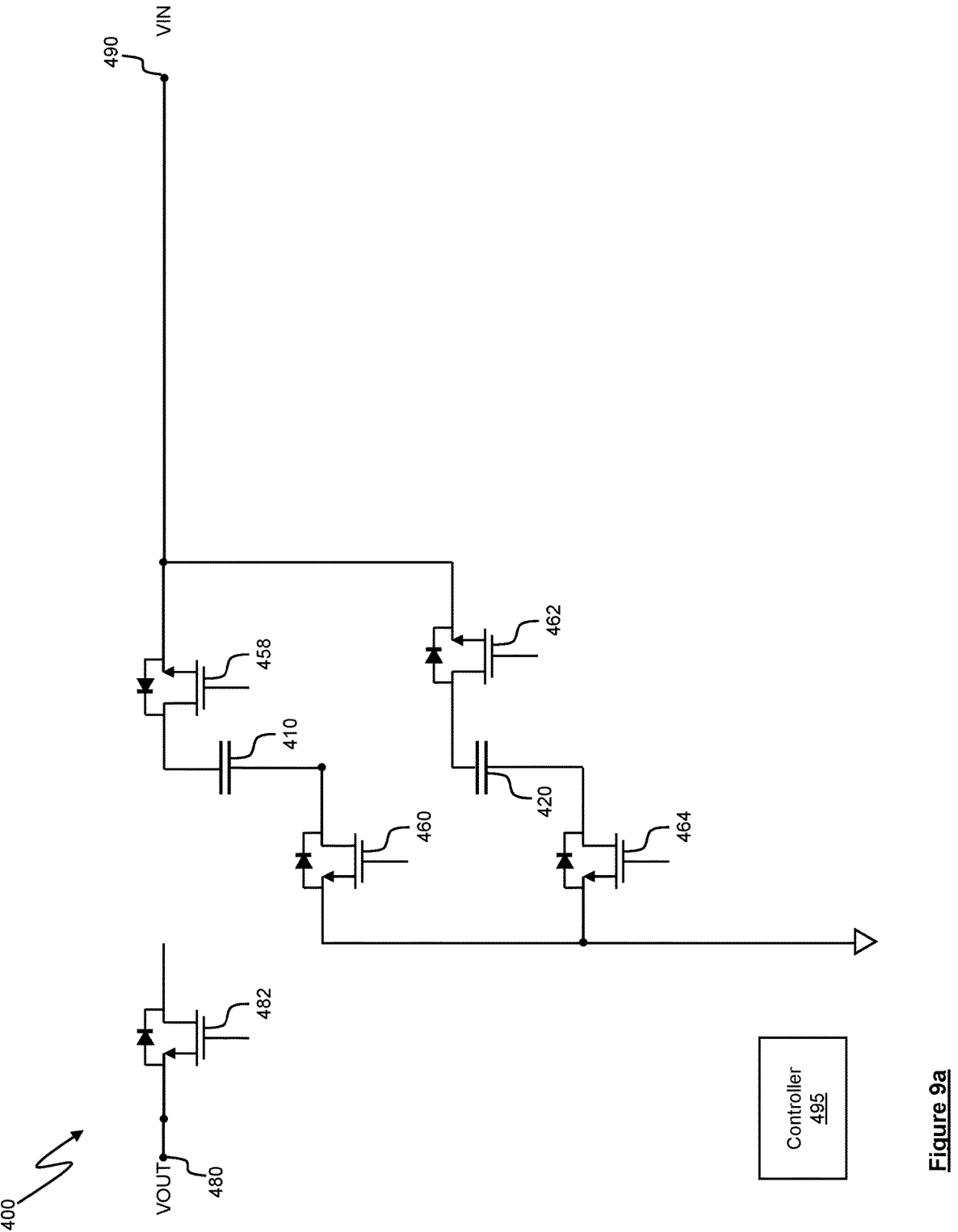
FIGS. 9a and 9b illustrate operation of the circuitry of FIG. 2 as a reverse switched capacitor power converter with a 1:2 input voltage to output voltage ratio.
Figure 9B:
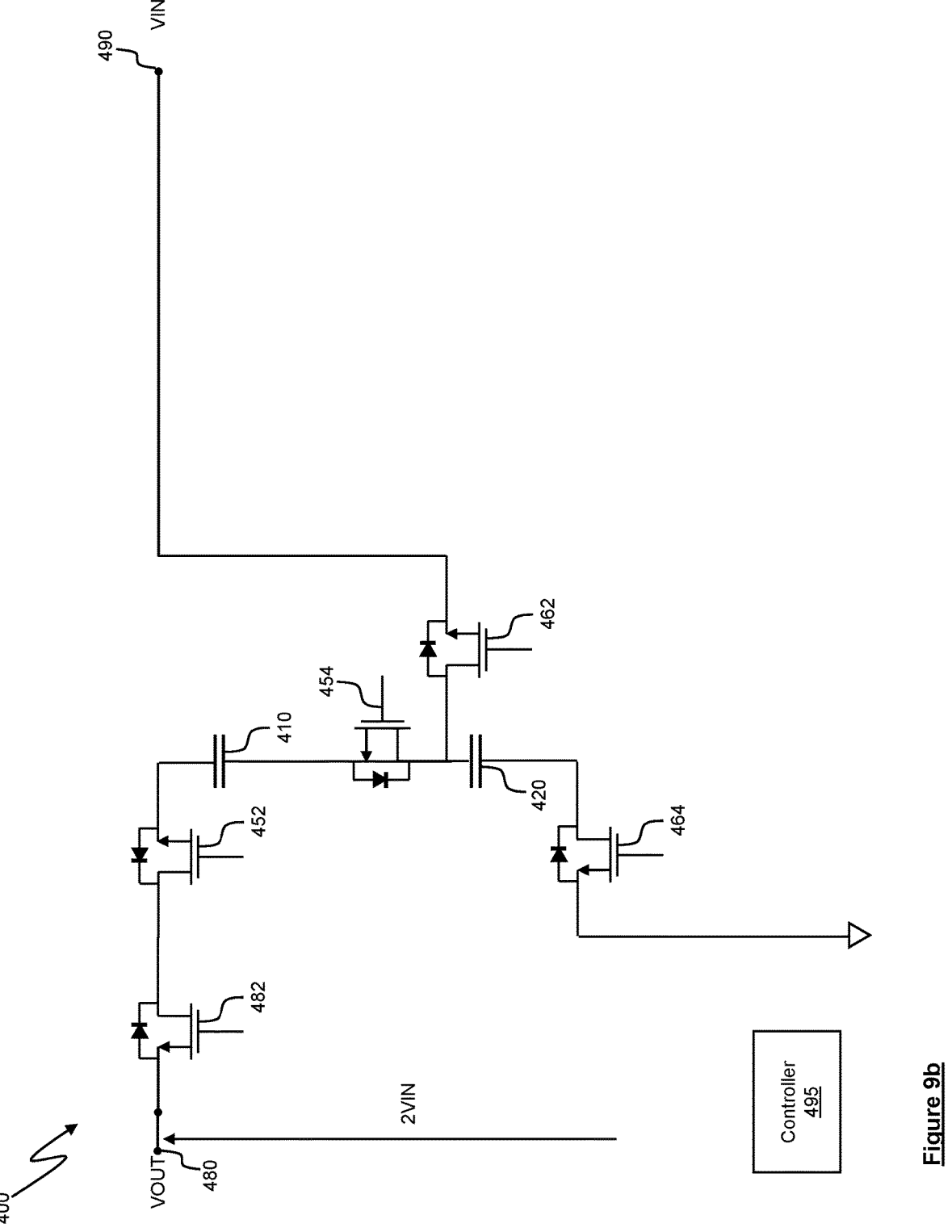

FIGS. 9*a*-9*b* are schematic diagrams illustrating operation of the power converter circuitry 400 in the first reverse mode as switched capacitor circuitry. In FIGS. 9*a*-9*b* the power converter circuitry 400 operates in its sixth sub-mode as a reverse switched capacitor power converter with a 1:2 input voltage to output voltage ratio (i.e. a step-up conversion factor of 2), to convert an input voltage VIN received at the output node 490 into a higher output voltage VOUT at the input node 480.

In a first phase of operation, shown in FIG. 9*a*, the fourth, fifth, sixth and seventh switches 458-464 are closed (i.e. switched on) in response to suitable control signals from the controller circuitry 495, such that the first and second flying capacitors 410, 420 are coupled in parallel with each other between the output node 490 (at which the input voltage VIN is received, e.g. from a battery, in this sub-mode) and the ground (or other reference voltage supply) rail or terminal, such that the first and second flying capacitors 410, 420 charge up to the input voltage VIN.

In a second phase of operation, shown in FIG. 9*b*, the first, second, sixth and seventh switches 452, 454 and 462, 464 of the switch network are closed (i.e. switched on) in response to suitable control signals from the controller circuitry 495, such that the first flying capacitor 410 is coupled in series between the output node 490 of the power converter circuitry 400 (at which the input voltage VIN is received, e.g. from a battery, in this sub-mode) and the input node 480 of the power converter circuitry 400 (at which the output voltage 400 is supplied, in this sub-mode), and the second flying capacitor 420 is coupled between the output node 490 and the ground (or other reference voltage supply) rail or terminal.

The other switches 456-460, 464-470 are open (i.e. switched off), in response to suitable control signals from the controller circuitry 495.

Thus, in the second phase of operation the first flying capacitor 410 acts as an additional voltage source in series with the input voltage VIN, such that the voltage of the first flying capacitor 410 combines with the input voltage VIN received at the output node 490 to generate the output voltage. As the first flying capacitor 410 was charged to the input voltage VIN during the first phase of operation, the output voltage VOUT at the input node 480 in the second phase of operation is 2VIN.

In an alternative approach, the sixth and seventh switches 462, 464 may be opened (i.e. switched off) in the first and second phases, in response to suitable control signals from the controller circuitry 495. In this approach, in the first phase only the first flying capacitor 410 is coupled between the output node 490 and the ground (or other reference voltage supply) rail or terminal, and thus charges to the input voltage VIN during the first phase.

In the second phase, the first flying capacitor 410 is coupled between the output node 490 and the input node 480 and acts as an additional voltage source in series with the input voltage VIN, such that the voltage of the first flying capacitor (which is equal to VIN, since the first flying capacitor 410 charged to VIN during the first phase) combines with the input voltage VIN such that the output voltage VOUT in the second phase is equal to 2VIN.

FIGS. 10*a*-10*d* are schematic diagrams illustrating operation of the power converter circuitry 400 in the second reverse mode as 3-level inductive boost converter circuitry with a duty cycle (defined as a ratio of the input voltage to the output voltage) of less than 0.5. In this mode the power converter circuitry may apply a non-integer step-up conversion factor to the input voltage VIN to generate the output voltage VOUT.

Figure 10A:
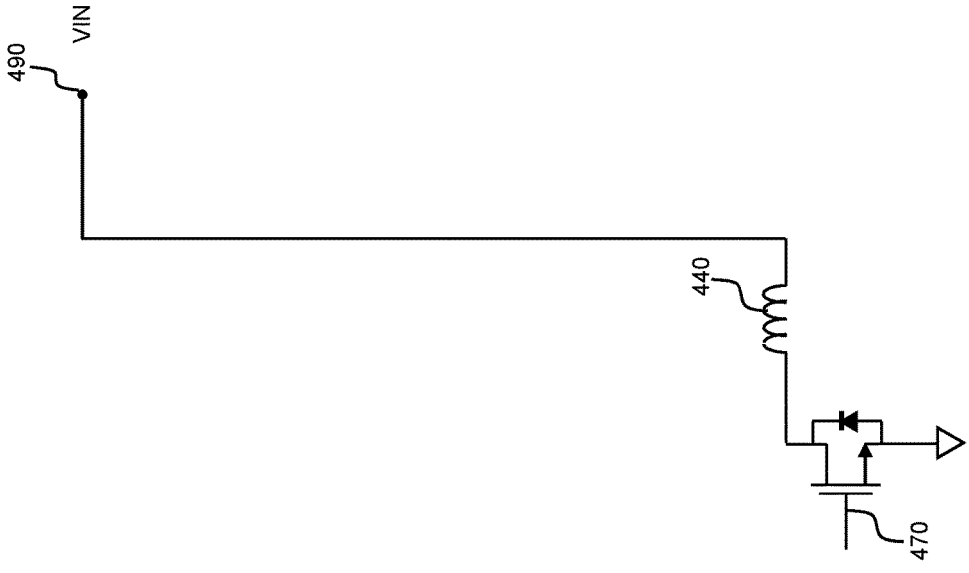
FIGS. 10a-10d illustrate operation of the circuitry of FIG. 2 as a reverse 3-level inductive boost converter with a duty cycle of less than 0.5.
Figure 10A:
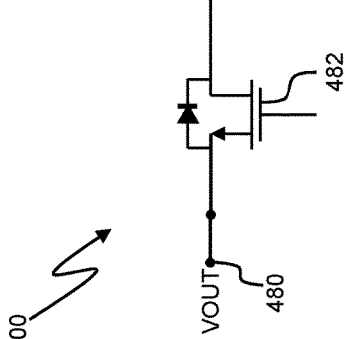

In a first phase of operation, shown in FIG. 10*a*, the tenth switch 470 is closed (i.e. switched on) and the other switches 452-468 of the switch network are opened (i.e. switched off) in response to suitable control signals from the controller circuitry 495. With the switch network in this configuration, the inductor 440 is coupled between the ground (or other reference voltage supply) rail or terminal and the output node 490. An increasing current thus flows through the inductor 440, as a result of the voltage difference between the input voltage VIN that is supplied to the output node 490 and the voltage of the ground (or other reference voltage supply) rail or terminal.

Figure 10B:
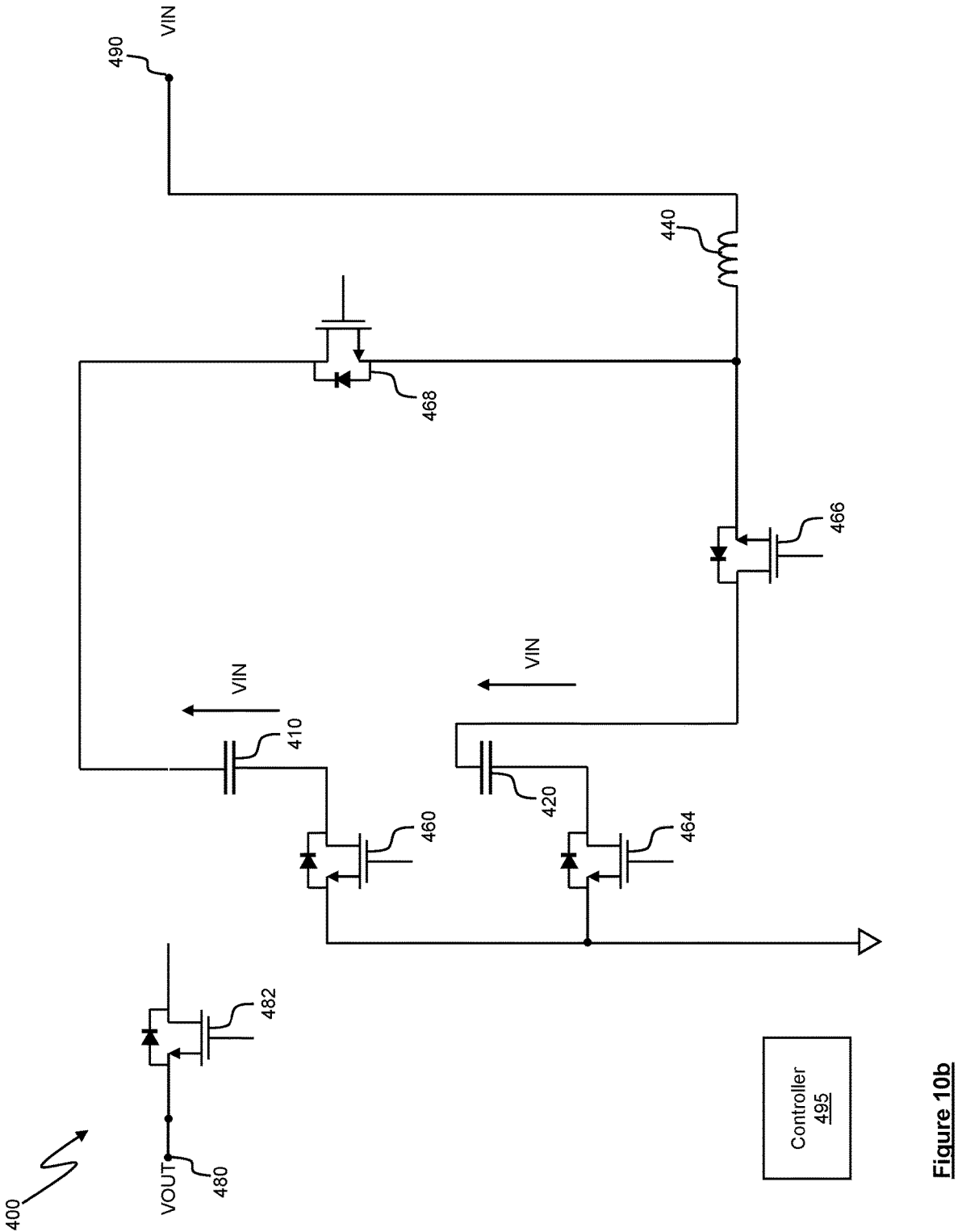

In a second phase of operation, shown in FIG. 10*b*, the fifth, seventh, eighth and ninth switches 460, 464, 466, 468 are closed (i.e. switched on) and the other switches 452-458, 462 and 470 are opened (i.e. switched off) in response to suitable control signals from the controller circuitry 495.

With the switch network in this configuration, the first and second flying capacitors 410, 420 are coupled in parallel with each other between the ground (or other reference voltage supply) rail or terminal and the first terminal of the inductor 440. An increasing current flows through the inductor 440 to the first and second flying capacitors 410, 420, charging both of the flying capacitors 410, 420 up to the input voltage VIN.

It will be noted that no separate flying capacitor is required when the power converter circuitry 400 operates in its second reverse mode as an inductive boost converter, because the flying capacitors 410, 420 that are used when the power converter circuitry 400 is operating in its first mode as a switched capacitor power converter are also used when the power converter circuitry 400 is operating in its second reverse mode as an inductive boost converter.

Figure 10C:
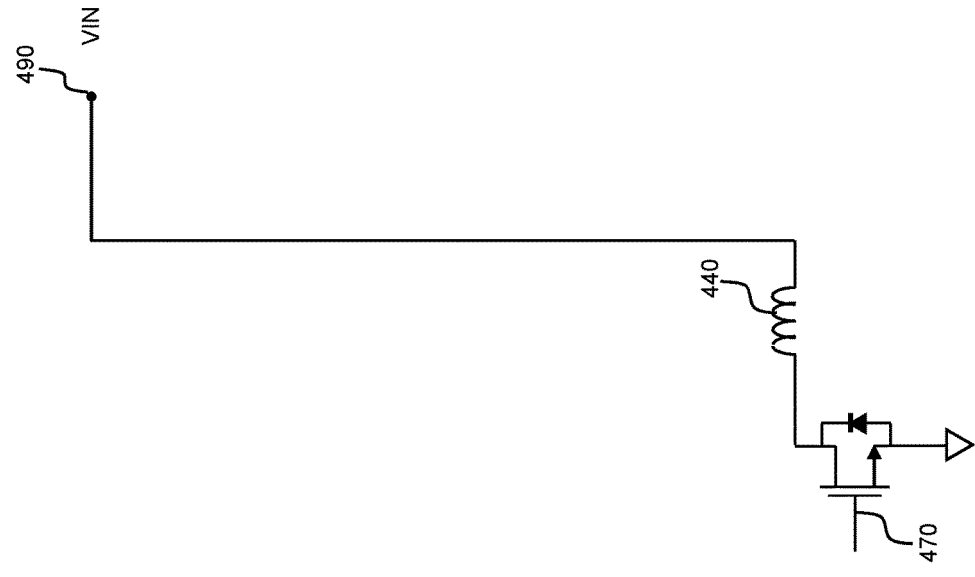
Figure 10C:
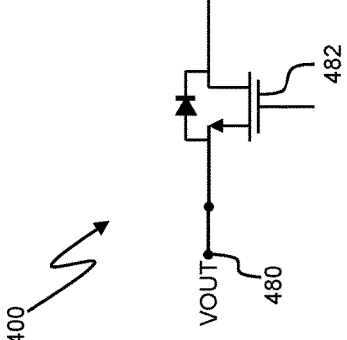

In a third phase of operation, shown in FIG. 10*c*, the switch network adopts the same configuration as in the first phase, with the tenth switch 470 being closed (i.e. switched on) and the other switches 452-468 of the switch network being opened (i.e. switched off) in response to suitable control signals from the controller circuitry 495.

With the switch network in this configuration, the inductor 440 is again coupled between the ground (or other reference voltage supply) rail or terminal and the output node 490. An increasing current thus flows through the inductor 440, as a result of the voltage difference between the input voltage VIN that is supplied to the output node 490 and the voltage of the ground (or other reference voltage supply) rail or terminal.

Figure 10D:
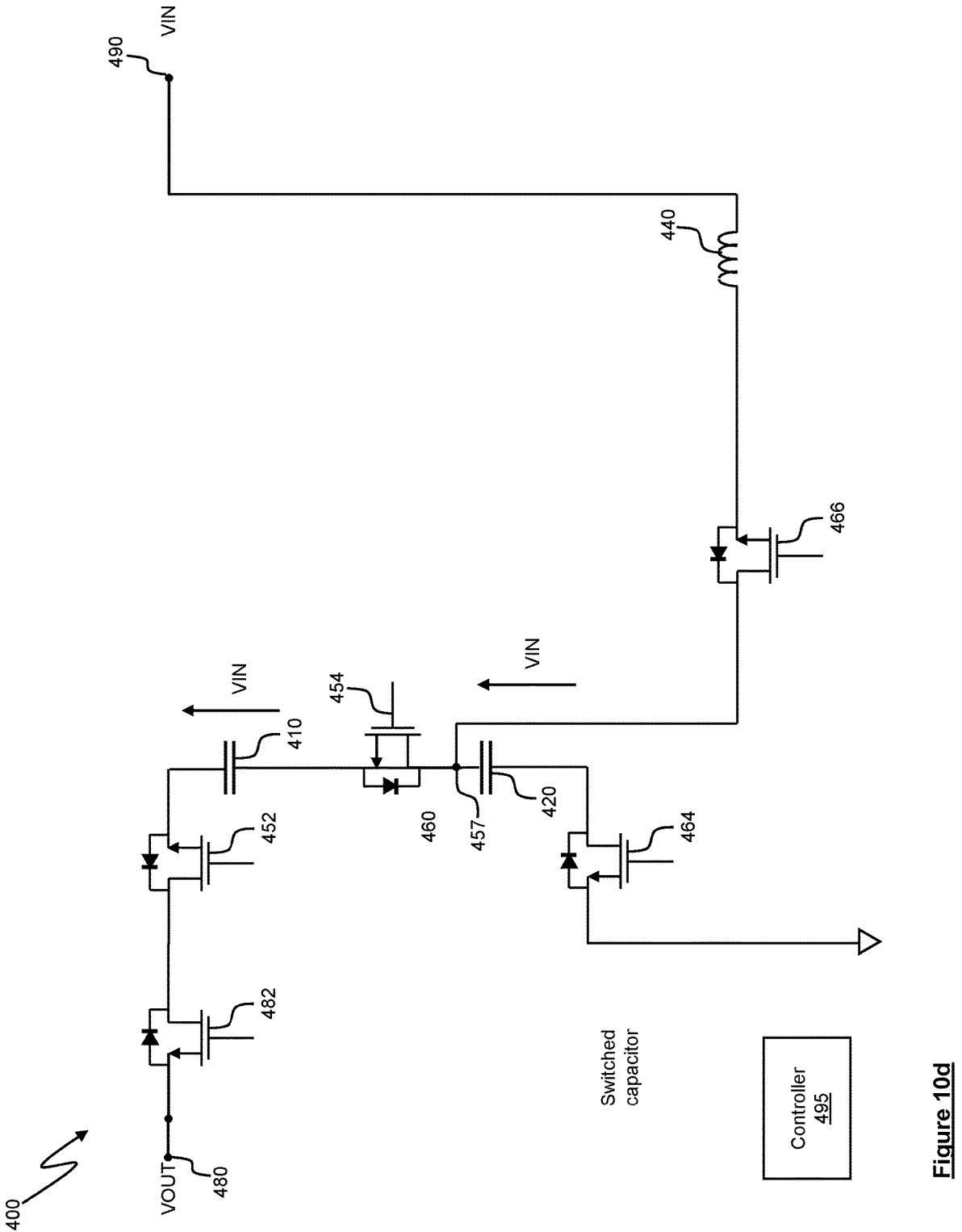

In a fourth phase of operation, shown in FIG. 10*d*, the input switch 428 is closed, in response to a suitable control signal from the controller circuitry 495, thus coupling the input node 480 to the switch network. The first, second, seventh and eighth switches 452, 454, 464, 466 are closed (i.e. switched on) and the other switches 456-462, 468, 470 of the switch network are opened (i.e. switched off) in response to suitable control signals from the controller circuitry 495.

With the switch network in this configuration, the output node 490 is coupled to the second terminal of the inductor 440 and the first terminal of the inductor is coupled to the third node 457 of the switch network, such that an increasing current flows through the inductor 440, and the input voltage VIN develops across the inductor 440. The first and second flying capacitors 410, 420 are coupled in series between the ground (or other reference voltage supply) rail or terminal and the input node 480. Thus, the voltages across the inductor 440 and the voltages across the first and second flying capacitors 410, 420 combine to produce an output voltage VOUT=VIN+VIND (where VIND is a charge voltage of the inductor 440, which is determined by the duty cycle) at the input node 480.

The repeated operation of the power converter circuitry 400 in the second and fourth phases illustrated in FIGS. 10b and 10d leads to balancing of the voltage of the second flying capacitor 420, such that no separate control of the voltage of the second flying capacitor 420 is not required, in contrast to the charging system 100 of FIG. 1a, where balancing of the voltage of the flying capacitor 320 of the inductive buck converter circuitry 300 must be performed by separate circuitry.

In the example illustrated in FIGS. 10a-10d, the input voltage VIN is greater than the voltage across the second flying capacitor 420. To prevent conduction by MOSFET body diodes of the fourth and sixth switches 458, 462, if the power converter circuitry 400 is to be used as a reverse 3-level inductive buck converter with a duty ratio greater than 0.5, then the fourth and sixth switches 458, 462 may each be implemented using a pair of back to back MOSFET devices as described above and shown in FIG. 6e.

FIGS. 11a-11d are schematic diagrams illustrating operation of the power converter circuitry 400 in the second reverse mode as 3-level inductive boost converter circuitry with a duty cycle (defined as a ratio of the input voltage to the output voltage) of greater than 0.5. In this mode the power converter circuitry may apply a non-integer step-up conversion factor to the input voltage VIN to generate the output voltage VOUT.

Figure 11A:
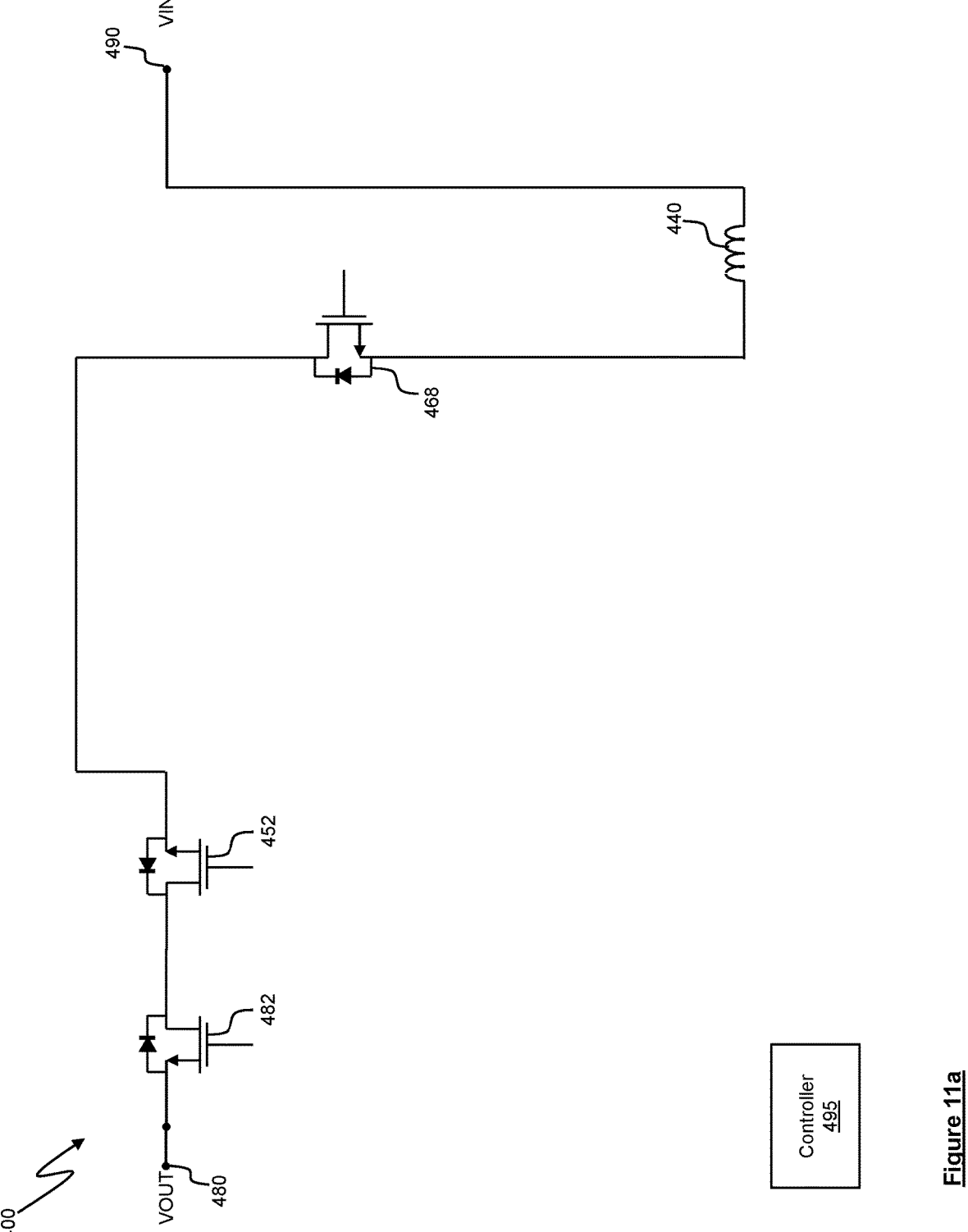
FIGS. 11a-11d illustrate operation of the circuitry of FIG. 2 as a reverse 3-level inductive buck converter with a duty cycle greater than 0.5.

In a first phase of operation, shown in FIG. 11a, the input switch 428 is closed, in response to a suitable control signal from the controller circuitry 495, thus coupling the input node 480 to the switch network. The first and ninth switches 452, 468 are closed (i.e. switched on) and the other switches 454-456, 460-470 of the switch network are opened (i.e. switched off) in response to suitable control signals from the controller circuitry 495.

With the switch network in this configuration, the output node 490 (to which an input voltage VIN is supplied) is coupled to the input node 480, via the inductor 440, the ninth and first switches 468, 452 and the input switch 482. An increasing current flows through the inductor 440, and a magnetic field develops around the inductor 440, storing energy.

Figure 11B:
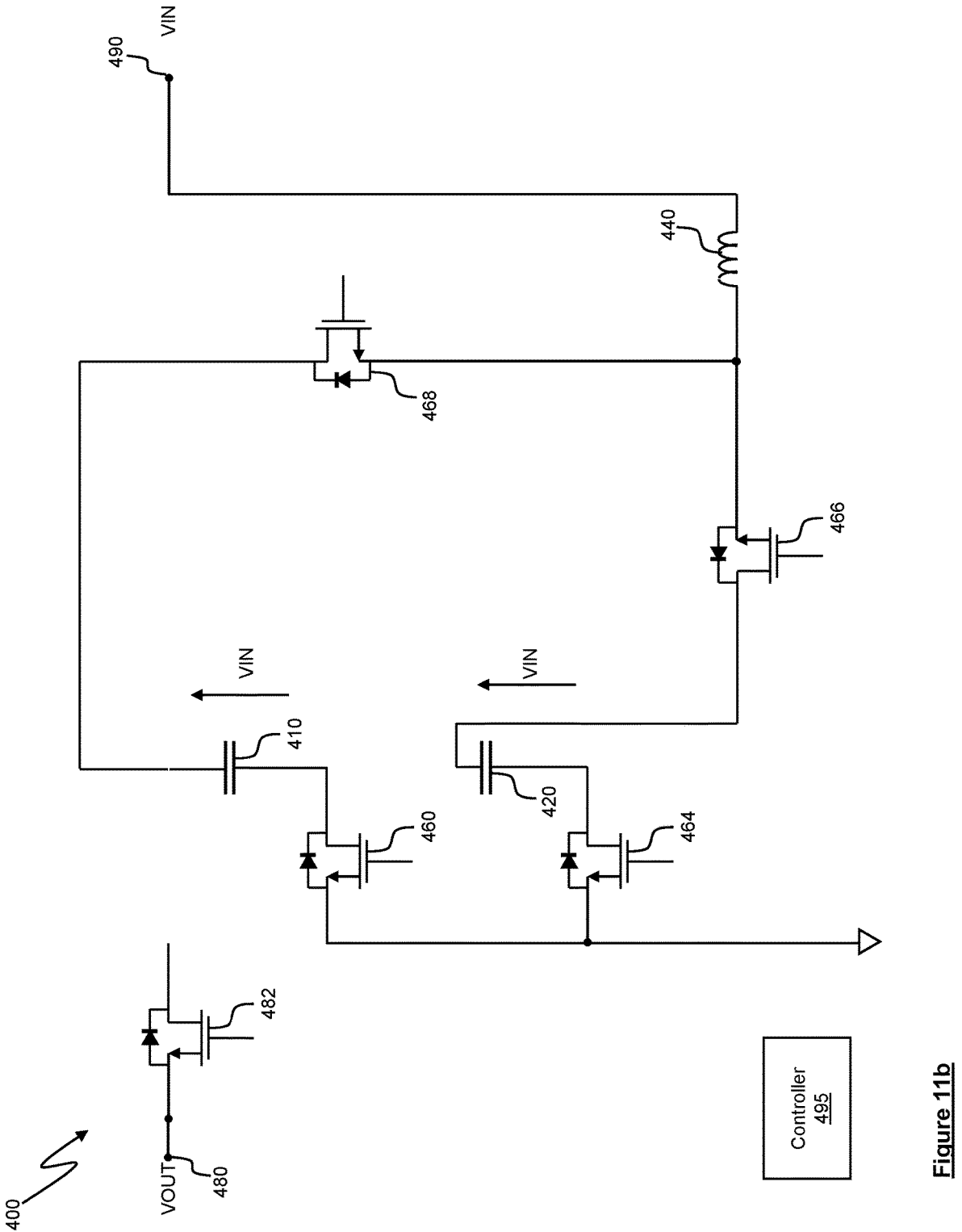

In a second phase of operation, shown in FIG. 11b, the fifth, seventh, eighth and ninth switches 460, 464, 466, 468 are closed (i.e. switched on) and the other switches 452-458, 462, 470 are opened (i.e. switched off) in response to suitable control signals from the controller circuitry 495.

With the switch network in this configuration, the first and second flying capacitors 410, 420 are coupled in parallel between the first terminal of the inductor 440 and the ground (or other reference voltage) supply rail or terminal. The second terminal of the inductor 440 is coupled to the output node 490. Thus, an increasing current flows through the inductor 440 to the first and second flying capacitors 410, 420, which charge up to the input voltage VIN.

Figure 11C:
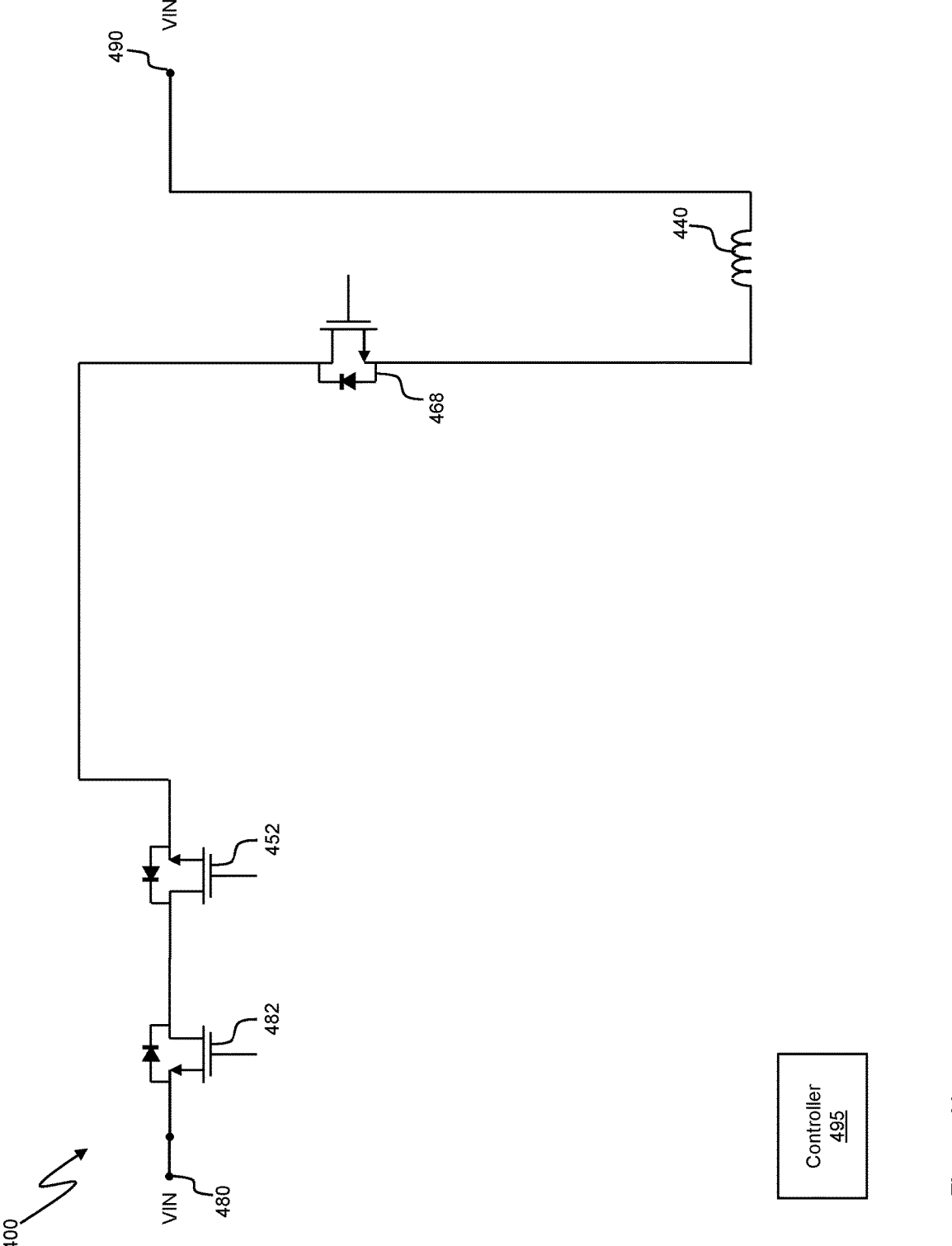

In a third phase of operation, shown in FIG. 11c, the switch network again adopts the configuration shown in FIG. 11a, with the first and ninth switches 452, 458 closed (i.e. switched on) and the other switches 454-456, 460-470 of the switch network opened (i.e. switched off) in response to suitable control signals from the controller circuitry 495. The input switch 428 is also closed, thus coupling the input node 480 to the switch network.

With the switch network in this configuration, the output node 490 is again coupled to the input node 480, via the inductor 440, the ninth and first switches 468, 452 and the input switch 482. An increasing current again flows through the inductor 440, which stores energy in a magnetic field.

Figure 11D:
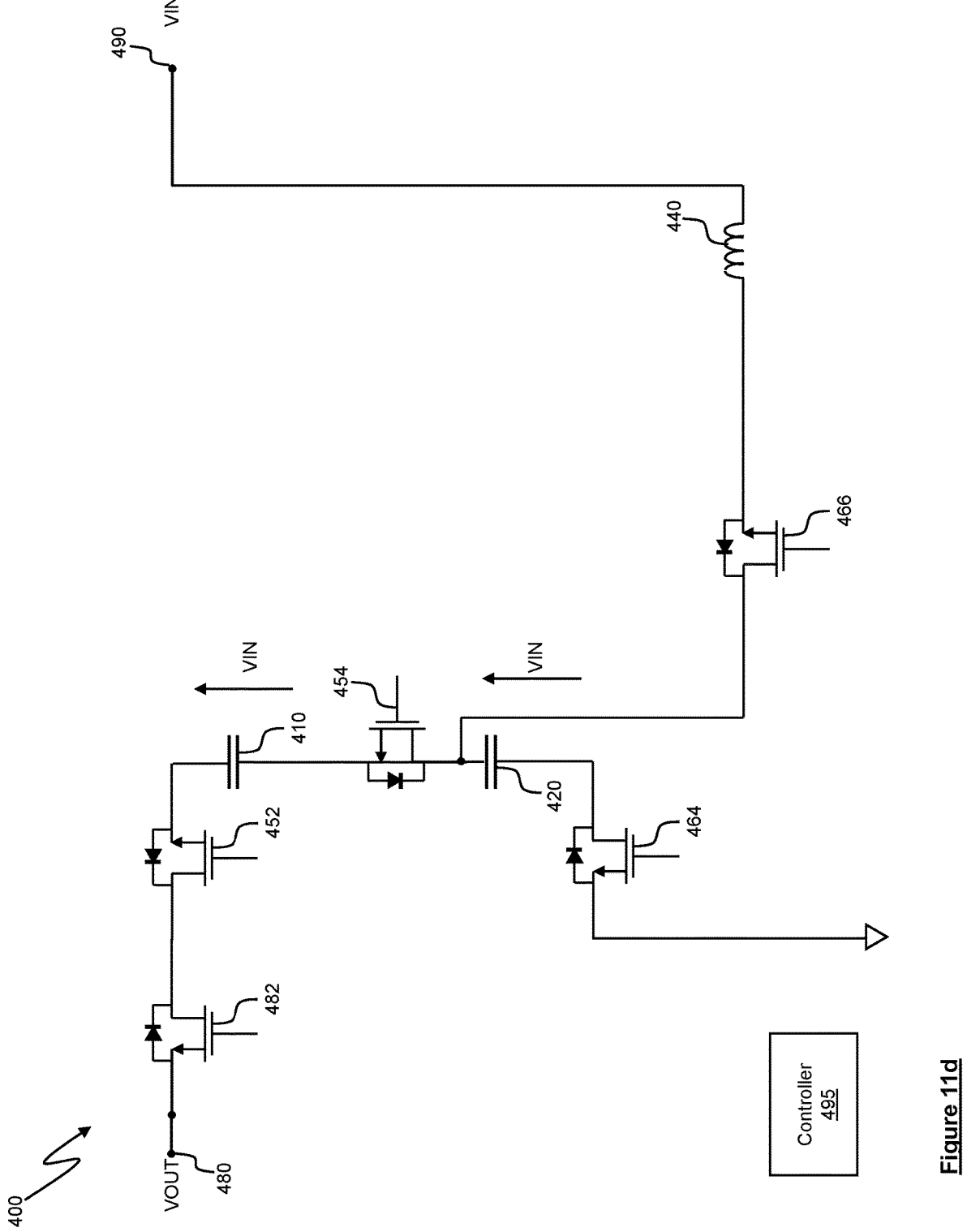

In a fourth phase of operation, shown in FIG. 11d, the input switch 482 is closed (i.e. switched on), in response to a suitable control signal from the controller circuitry 495, thus coupling the input node 480 to the switch network. The first, second, seventh and eighth switches 452, 454, 464, 466 are closed (i.e. switched on) and the other switches 456, 458-462, 468, 470 are opened (i.e. switched off) in response to suitable control signals from the controller circuitry 495.

With the switch network in this configuration, the output node 490 is coupled to the second terminal of the inductor 440 and the first terminal of the inductor is coupled to the third node 457 of the switch network, such that an increasing current flows through the inductor 440 and the input voltage VIN develops across the inductor 440. The first and second flying capacitors 410, 420 are coupled in series between the ground (or other reference voltage supply) rail or terminal and the input node 480. Thus, the voltages across the inductor 440 and the voltages across first and second flying capacitors 410, 420 combine to produce an output voltage VOUT=VIN+VIND (where VIND is a charge voltage of the inductor 440, which is determined by the duty cycle) at the input node 480.

The repeated operation of the power converter circuitry 400 in the second and fourth phases illustrated in FIGS. 11b and 11d leads to balancing of the voltage of the second flying capacitor 420, such that no separate control of the voltage of the second flying capacitor 420 is not required, in contrast to the system 100 of FIG. 1a, where balancing of the voltage of the flying capacitor 320 of the inductive buck converter circuitry 300 must be performed by separate circuitry.

Figure 12A:
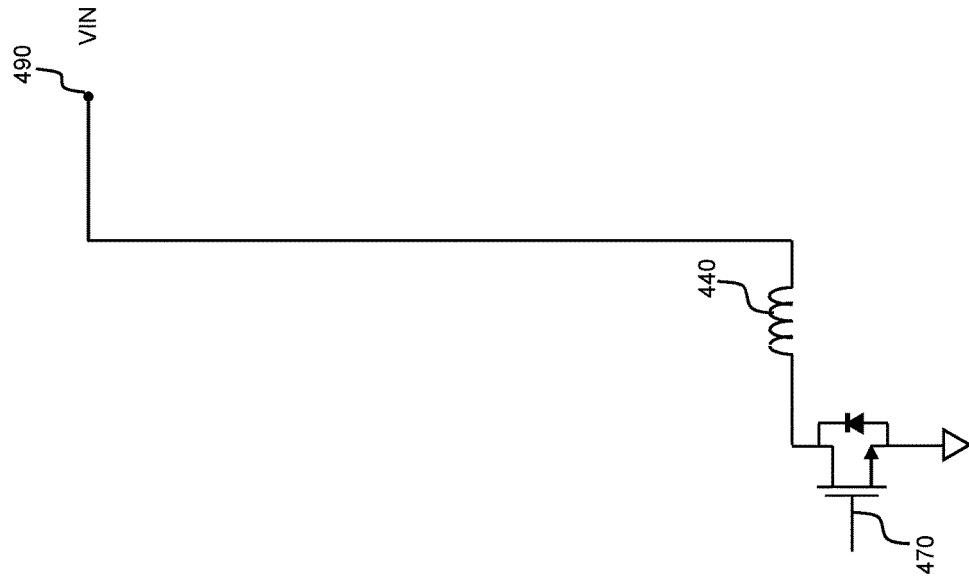
FIGS. 12a-12b illustrate operation of the circuitry of FIG. 2 as a reverse 2-level inductive buck converter.
Figure 12A:
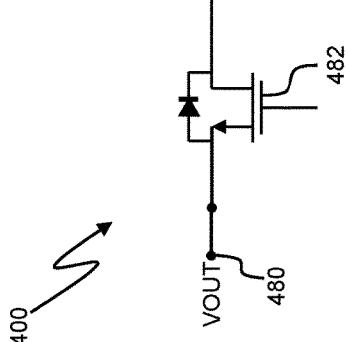
Figure 12B:
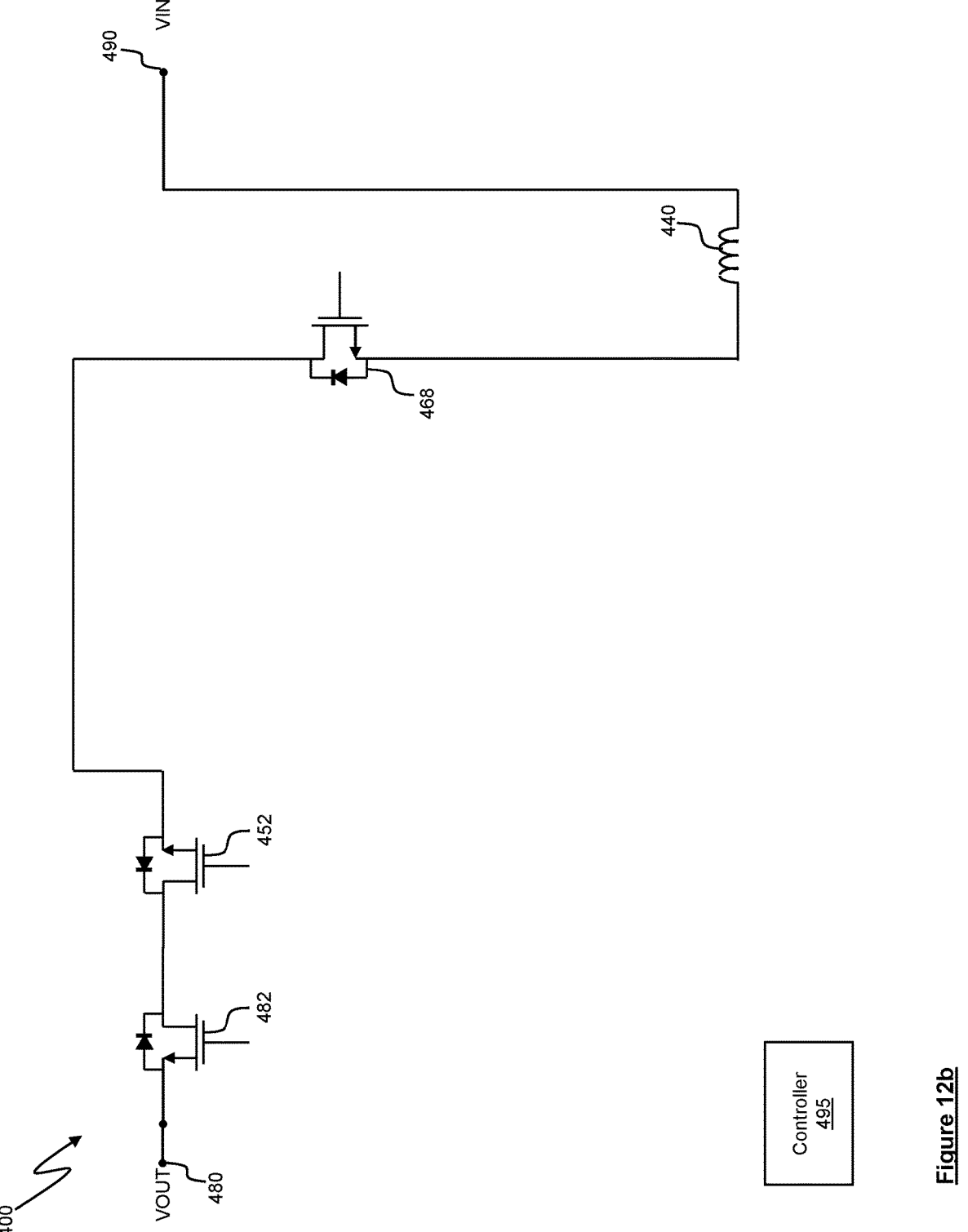

FIGS. 12a and 12b are schematic diagrams illustrating operation of the power converter circuitry 400 in the second reverse mode as 2-level inductive boost converter circuitry. In this mode the power converter circuitry may apply a non-integer step-up conversion factor to the input voltage VIN to generate the output voltage VOUT.

In a first phase of operation, shown in FIG. 12a, the tenth switch 470 is closed (i.e. switched on) and the other switches 452-468 of the switch network are opened (i.e. switched off) in response to suitable control signals from the controller circuitry 495.

With the switch network in this configuration, the inductor 440 is coupled between the output node 490 (at which an input voltage VIN is received in this example) and the ground (or other reference voltage) supply rail or terminal. An increasing current thus flows through the inductor 440, which generates a magnetic field around the inductor 440 in which energy is stored.

In a second phase of operation, shown in FIG. 12b, the input switch 482 is closed (i.e. switched on) in response to a suitable control signal from the controller circuitry 495, thus coupling the switch network to the input node 480. The first and ninth switches 452, 468 of the switch network are closed (i.e. switched on) and the other switches 454-466, 470 are opened (i.e. switched off) in response to suitable control signals from the controller circuitry 495.

With the switch network in this configuration, the output node 490 is coupled to the input node 480 via the inductor

440, the ninth and first switches 468, 452 and the input switch 482 are closed (i.e. switched off) in response to suitable control signals from the controller circuitry 495. The inductor 440 thus acts as an additional voltage source in series with the input voltage VIN, such that an output voltage VOUT greater than VIN develops at the output node 480.

As will be apparent from the foregoing discussion, the circuitry 400 of the present disclosure provides a single circuit that can operate in switched capacitor converter and inductive buck converter modes to generate a reduced output voltage from an input voltage. Thus, the circuitry 400 of the present disclosure can support the charging modes required in a charging system of the kind described above with respect to FIG. 1*a* in a single circuit, such that separate switched capacitor circuitry and inductive buck converter circuitry is not required. Accordingly, the present disclosure extends to a charging system comprising the circuitry 400.

By providing a single circuit that is operable in switched capacitor converter and inductive buck converter modes, a reduction in the number of switches and capacitors that are required can be achieved, compared to a system that uses separate switched capacitor circuitry and inductive buck converter circuitry. Additionally, the combined switched capacitor and inductive buck converter circuitry of the present disclosure can be implemented in a single integrated circuit.

Furthermore, the circuitry 400 of the present disclosure is also operable in switched capacitor converter and inductive boost converter modes to generate an increased output voltage from an input voltage.

The circuitry described above with reference to the accompanying drawings may be incorporated in a host device such as a laptop, notebook, netbook or tablet computer, a gaming device such as a games console or a controller for a games console, a virtual reality (VR) or augmented reality (AR) device, a mobile telephone, a portable audio player or some other portable device, or may be incorporated in an accessory device for use with a laptop, notebook, netbook or tablet computer, a gaming device, a VR or AR device, a mobile telephone, a portable audio player or other portable device.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

The invention claimed is:

1. A power converter integrated circuit comprising:
a switch network comprising:
   a plurality of switches;
   a first set of coupling nodes for coupling the switch network to a first flying capacitor;
   a second set of coupling nodes for coupling the switch network to a second flying capacitor;
   an output node for coupling the switch network to an output capacitor; and
   a third set of one or more coupling nodes for coupling the switch network to an inductor,
   wherein the power converter integrated circuit is operable in a first forward mode as a switched capacitor converter and in a second forward mode as an inductive converter,
   wherein:
      in the first forward mode the switch network is operable to couple the first flying capacitor in series with the output capacitor in a first phase of operation, and to couple the first flying capacitor and the output capacitor in parallel in a second phase of operation; and
      in the second forward mode the switch network is operable to couple the first flying capacitor in series with the inductor and the output capacitor in a phase of operation and to couple the first flying capacitor in parallel with the output capacitor, via the inductor, in a subsequent phase of operation.

2. The power converter integrated circuit of claim 1, wherein in operation of the power converter integrated circuit in the first forward mode, the switch network is operable to couple the first and second flying capacitors in series with the output capacitor in a first phase of operation, and to couple the first and second flying capacitors and the output capacitor in parallel in a second phase of operation.

3. The power converter integrated circuit of claim 1, wherein in operation of the power converter integrated circuit in the second forward mode, the switch network is operable to couple the inductor in parallel with the output capacitor in a further phase of operation.

4. The power converter integrated circuit of claim 1, wherein in operation of the power converter integrated circuit in the second forward mode, the switch network is operable to couple the inductor in series with the output capacitor in a further phase of operation.

5. The power converter integrated circuit of claim 1, wherein in operation of the power converter integrated circuit in the second forward mode, the phase of operation in which the switch network is operable to couple the inductor in series with the output capacitor in is a first phase of operation in the second forward mode, and the switched network is operable to couple the inductor in parallel with the output capacitor in a second phase of operation in the second forward mode.

6. The power converter integrated circuit of claim 1, wherein the power converter integrated circuit is operable in a first reverse mode as a switched capacitor converter and in a second reverse mode as an inductive boost converter.

7. The power converter integrated circuit of claim 6, wherein in operation of the power converter integrated circuit in the first reverse mode, the switch network is operable to couple the first flying capacitor to the output node of the power converter integrated circuit in a first phase of operation, and to couple the first flying capacitor in series between the output node and an input node of the power converter integrated circuit in a second phase of operation.

8. The power converter integrated circuit of claim 6, wherein in operation of the power converter integrated circuit in the first reverse mode, the switch network is operable to couple the first and second flying capacitors in parallel with each other to the output node of the power converter integrated circuit in a first phase of operation, and to couple the first and second flying capacitors in series between the output node and an input node of the power converter integrated circuit in a second phase of operation.

9. The power converter integrated circuit of claim 1, wherein in operation of the power converter integrated circuit in the second reverse mode, the switch network is operable to couple the first and second flying capacitors in parallel with each other and in series with the inductor in a phase of operation and to couple the inductor and the first flying capacitor in series between the output node and the input node in a subsequent phase of operation.

10. The power converter integrated circuit of claim 1, wherein in operation of the power converter integrated circuit in the second reverse mode, the switch network is operable to:
   couple the inductor to the output node of the power converter integrated circuit in a first phase of operation;
   couple the first and second flying capacitors in parallel with each other and in series with the inductor in a second phase of operation;
   couple the inductor to the output node in a third phase of operation; and
   couple the inductor and the first flying capacitor in series between the output node and the input node in a fourth phase of operation.

11. The power converter integrated circuit of claim 1, wherein in operation of the power converter integrated circuit in the second reverse mode, the switch network is operable to:
   couple the inductor in series between an input node and the output node of the power converter integrated circuit in a first phase of operation;
   couple the first and second flying capacitors in parallel with each other and in series with the inductor in a second phase of operation;
   couple the inductor in series between the input node and the output node in a third phase of operation; and
   couple the inductor and the first flying capacitor in series between the output node and the input node in a fourth phase of operation.

12. The power converter integrated circuit of claim 1, wherein in operation of the power converter integrated circuit in the second reverse mode, the switch network is operable to couple the inductor to the output node of the power converter integrated circuit in a first phase of operation, and to couple the inductor in series between the output node and an input node of the power converter integrated circuit in a second phase of operation.

13. The power converter integrated circuit of claim 1, wherein the third set of one or more coupling nodes comprises a first inductor coupling node and the output node.

14. The power converter integrated circuit of claim 1, wherein the switch network comprises first to tenth switches, and wherein, in use of the power converter integrated circuit:

the output capacitor is coupled to the output terminal of the power converter integrated circuit;

a first terminal of the first flying capacitor is coupled to a first switch network node between the first switch and the fourth switch;

a second terminal of the first flying capacitor is coupled to a second switch network node between the second switch and the fifth switch;

a first terminal of the second flying capacitor is coupled to a third switch network node between the second switch and the sixth switch;

a second terminal of the second flying capacitor is coupled to a fourth switch network node between the third switch and the seventh switch;

a first terminal of the inductor is coupled to a switch network node between the ninth switch and the tenth switch;

the eighth switch is coupled between the third switch network node and the first terminal of the inductor;

the ninth switch is coupled between the first switch network node and the first terminal of the inductor; and the tenth switch is coupled between the first terminal of the inductor and the reference voltage terminal.

15. The power converter integrated circuit of claim 14, wherein the fourth switch and/or the sixth switch comprises a first MOSFET device and a second MOSFET device, wherein a source terminal of the first MOSFET device is coupled to a source terminal of the second MOSFET device such that an anode of a body diode of the first MOSFET device is coupled to an anode of a body diode of the second MOSFET device.

16. The power converter integrated circuit of claim 14, further comprising an input switch coupled between an input node of the power converter integrated circuit and the first switch.

17. Power converter circuitry for generating an output voltage based on an input voltage, the power converter circuitry comprising:

a switch network comprising:

a plurality of switches;

a first set of coupling nodes for coupling the switch network to a first flying capacitor;

a second set of coupling nodes for coupling the switch network to a second flying capacitor;

an output node for coupling the switch network to an output capacitor; and a third set of one or more coupling nodes for coupling the switch network to an inductor, wherein the power converter circuitry is operable in:

a first forward mode in which a substantially integer conversion factor greater than one is applied to the input voltage to generate the output voltage; and a second forward mode in which a non-integer conversion factor is applied to the input voltage to generate the output voltage.

18. A battery charging system comprising the power converter integrated circuit of claim 1.

19. A host device comprising the power converter integrated circuit of claim 1, wherein the host device comprises a laptop, notebook, netbook or tablet computer, a gaming device, a games console, a controller for a games console, a virtual reality (VR) or augmented reality (AR) device, a mobile telephone, a portable audio player, a portable device, an accessory device for use with a laptop, notebook, netbook or tablet computer, a gaming device, a games console, a VR or AR device, a mobile telephone, a portable audio player or other portable device.

* * * * *